(12) United States Patent
Ogawa et al.

(10) Patent No.: US 6,850,469 B2
(45) Date of Patent: Feb. 1, 2005

(54) INFORMATION RECORDING MEDIUM WITH INDEX HEADER

(75) Inventors: Akihito Ogawa, Yokohama (JP); Toshihiro Sugaya, Kitasoma-gun (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 751 days.

(21) Appl. No.: 09/803,104

(22) Filed: Mar. 12, 2001

(65) Prior Publication Data

US 2004/0202083 A1 Oct. 14, 2004

(30) Foreign Application Priority Data

| Jul. 26, 2000 | (JP) | ......................................... 2000-224724 |
| Oct. 24, 2000 | (JP) | ......................................... 2000-324188 |

(51) Int. Cl.[7] ................................................. G11B 7/00
(52) U.S. Cl. ................................. 369/47.22; 369/59.25; 369/94; 369/275.3
(58) Field of Search ............................ 369/13.06, 13.38, 369/44.13, 44.26, 47.22, 47.27, 47.37, 59.25, 94, 111, 275.3, 275.4, 284, 286

(56) References Cited

U.S. PATENT DOCUMENTS

| 5,414,451 A | 5/1995 | Sugiyama et al. |
| 5,867,474 A | 2/1999 | Nagasawa et al. |
| 6,172,961 B1 * | 1/2001 | Tanoue et al. ........... 369/275.4 |
| 6,667,949 B2 * | 12/2003 | Stek et al. ................ 369/275.3 |
| 6,738,322 B2 * | 5/2004 | Amble et al. ............. 369/44.27 |
| 6,751,178 B1 * | 6/2004 | Lee et al. ................. 369/59.25 |

FOREIGN PATENT DOCUMENTS

| EP | 0 426 409 | 5/1991 |
| EP | 1 128 368 | 8/2001 |
| JP | 3-219440 | 9/1991 |
| JP | 9-27127 | 1/1997 |
| JP | 9-106578 | 4/1997 |
| JP | 2002-92939 | 3/2002 |
| WO | WO 00/08637 | 2/2000 |
| WO | WO 00/16320 | 3/2000 |

OTHER PUBLICATIONS

I, Satoh, et al., IEEE Transactions on Magnetics, vol. 34, No. 2, XP–000955343, pp. 337–342. " Key Technology for High Density Rewritable DVD (DVD–RAM)", Mar. 1998.

* cited by examiner

Primary Examiner—Thang V. Tran
Assistant Examiner—Bach Vuong
(74) Attorney, Agent, or Firm—Oblon, Spivak, McClelland, Maier & Neustadt, P.C.

(57) ABSTRACT

An information recording medium has a plurality of stacked recording layers. Each recording layer has a spiral track which defines a plurality of rounds, and at least one index header aligned in the radial direction of the disk to partially intercept the spiral track. The index header has address data of each round of the spiral track, which is formed by embossed pits, and some or all of the index headers of the first and second recording layers are laid out to overlap each other when viewed from the predetermined surface.

23 Claims, 30 Drawing Sheets

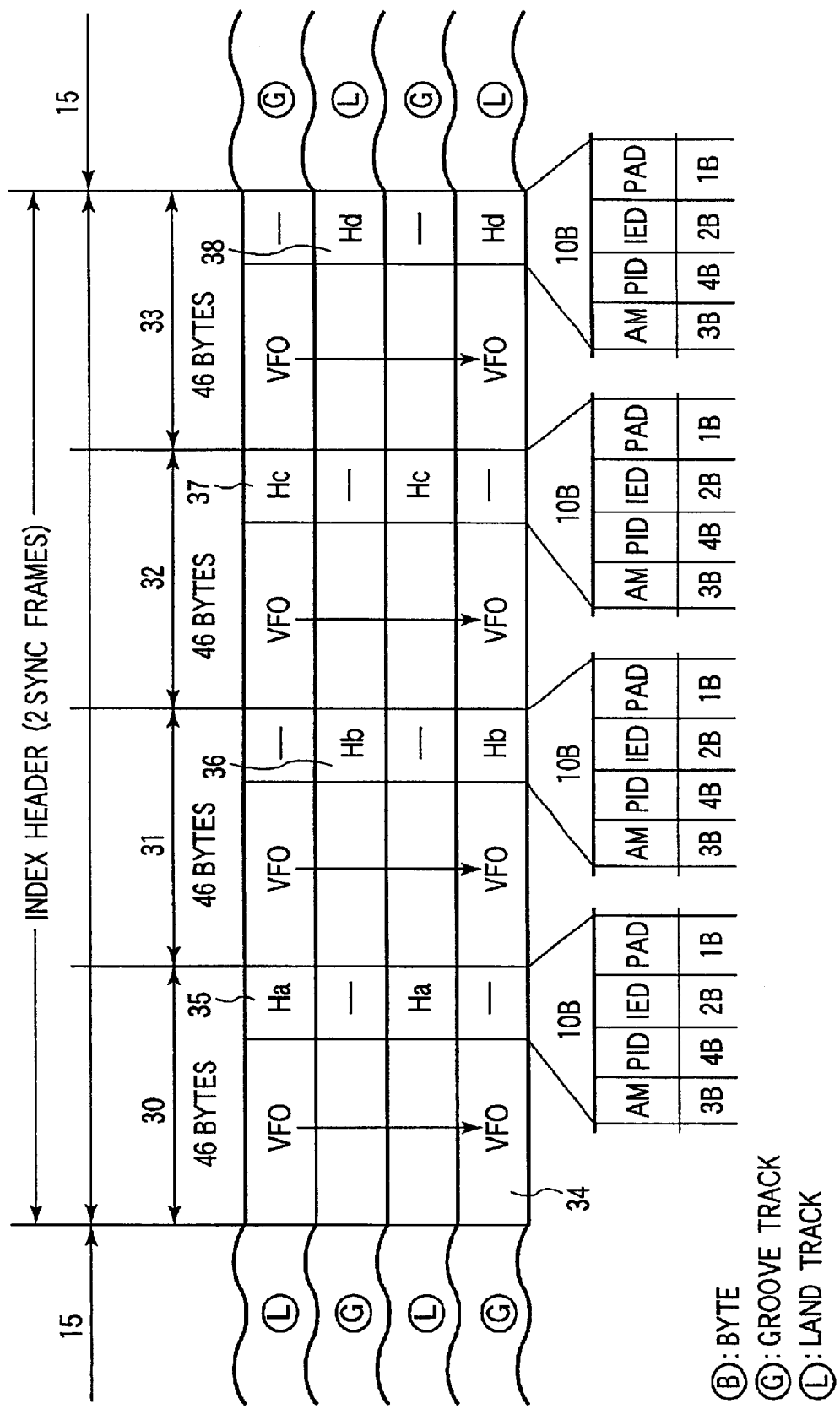
F I G. 8

LAYOUT OF RECORDING FIELDS OF EACH TRACK
(1280 FRAMES/TRACK)
NUMBER OF SYNC FRAMES/RECORDING FIELD

| TRACK NUMBER | IH AND DUMMY AREA (12) | | | | | | | | | |
|---|---|---|---|---|---|---|---|---|---|---|
| 0 | 3 | 420 | 420 | 420 | | | | | | 20 |
| 1 | 3 | 404 | 420 | 420 | | | | | 36 | 17 |
| ......... | ......... | ......... | | | | | | | | |
| 24 | 3 | 36 | 420 | 420 | 404 | | | | | |
| 25 | 3 | 20 | 420 | 420 | 420 | | | 20 | | |
| 26 | 3 | 420 | 420 | 420 | | | | | | |
| ...... | ...... | ...... | | | | | | | | |
| 969 | 3 | 308 | 420 | 420 | | | | | | 132 |

FIG. 17

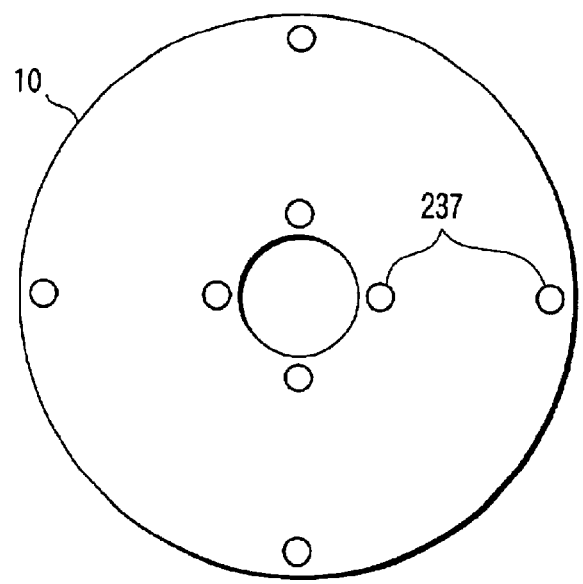
F I G. 21
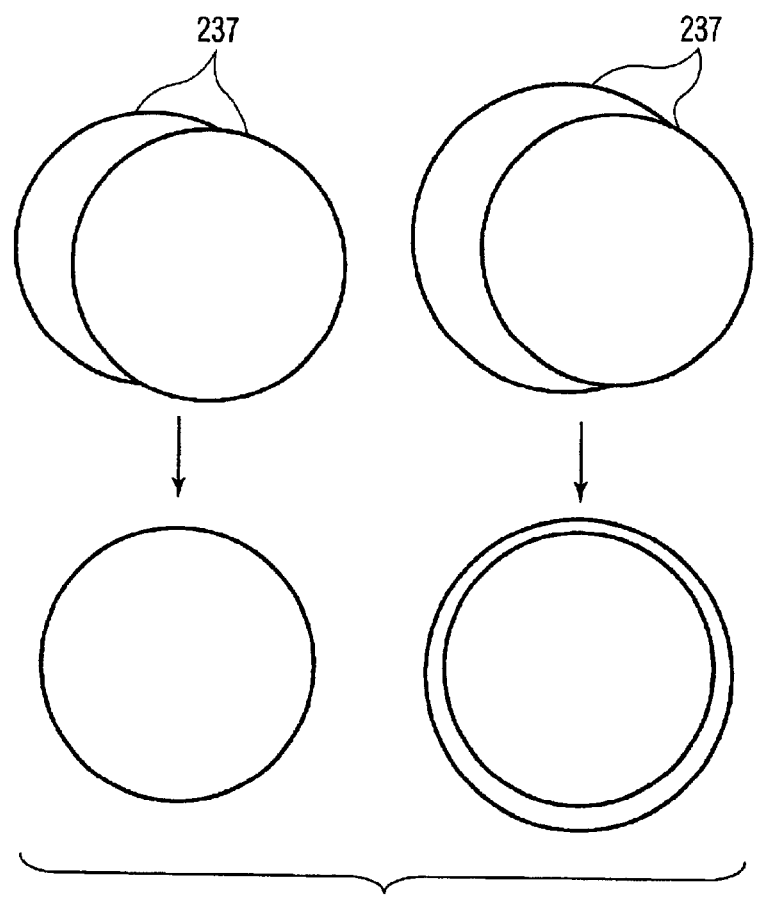
F I G. 22

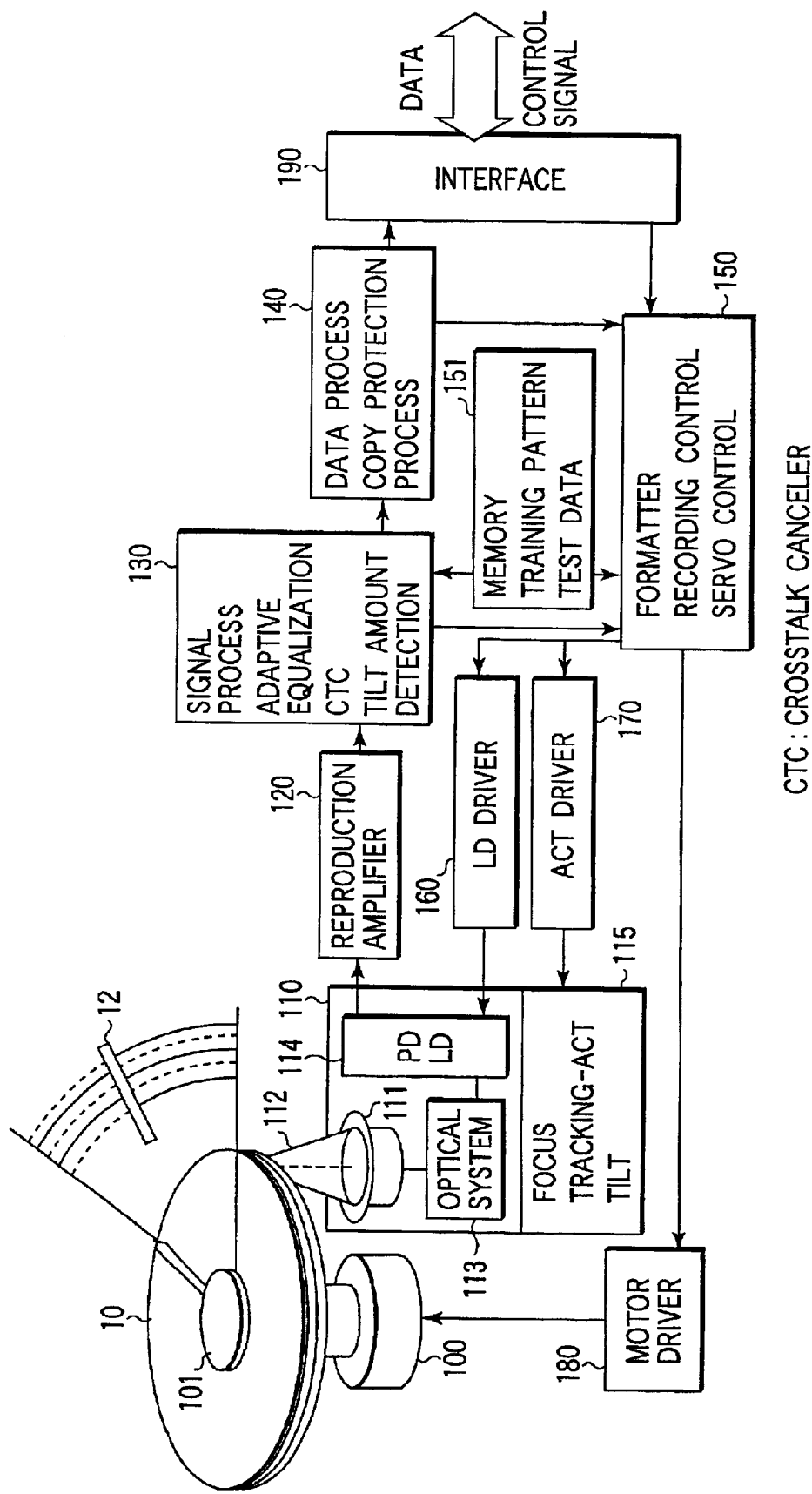
F I G. 23

| TRACK NUMBER | RADIUS (mm) | NUMBER OF WOBBLES | NUMBER OF SYNC FRAMES | NUMBER OF BYTES | ADJUSTMENT AREA b SPACING (WOBBLES) | ADJUSTMENT AREA a SPACING (WOBBLES) |
|---|---|---|---|---|---|---|
| 0 | 24.00034 | 10181.9 | 1272 | 118354 | 4 | 0.9 |
| 1 | 24.00069 | 10182.1 | 1272 | 118365 | 5 | 0.1 |
| 2 | 24.00104 | 10182.2 | 1272 | 118365 | 5 | 0.2 |
| 3 | 24.00139 | 10182.4 | 1272 | 118365 | 5 | 0.4 |
| 4 | 24.00174 | 10182.5 | 1272 | 118365 | 5 | 0.5 |
| 5 | 24.00208 | 10182.6 | 1272 | 118365 | 5 | 0.6 |
| 6 | 24.00243 | 10182.8 | 1272 | 118365 | 5 | 0.8 |
| 7 | 24.00278 | 10182.9 | 1272 | 118365 | 5 | 0.9 |
| 8 | 24.00313 | 10183.1 | 1272 | 118367 | 6 | 0.1 |
| ...... | ...... | ...... | ...... | ...... | ...... | ...... |

F I G. 31

| TRACK NUMBER | IH | CONFIGURATION OF RECORDING FIELD OF EACH TRACK NUMBER OF SYNC FRAMES/RECORDING FIELD | | | | | ADJUSTMENT AREA | NUMBER OF WOBBLES/ ADJUSTMENT AREA |
|---|---|---|---|---|---|---|---|---|
| 0 | 2 | 420 | 420 | 420 | 420 | 10 | 4 | 0.9 |
| 1 | 2 | 414 | 420 | 420 | 420 | 16 | 5 | 0.1 |
| 2 | 2 | 408 | 420 | 420 | 420 | 22 | 5 | 0.2 |
| 3 | 2 | 402 | 420 | 420 | 420 | 28 | 5 | 0.4 |
| 4 | 2 | 396 | 420 | 420 | 420 | 34 | 5 | 0.5 |
| 5 | 2 | 390 | 420 | 420 | 420 | 40 | 5 | 0.6 |
| 6 | | | | | | | | |

FIG. 32

INFORMATION RECORDING MEDIUM WITH INDEX HEADER

CROSS-REFERENCE TO RELATED APPLICATIONS

This application is based upon and claims the benefit of priority from the prior Japanese Patent Applications No. 2000-224724, filed Jul. 26, 2000; and No. 2000-324188, filed Oct. 24, 2000, the entire contents of both of which are incorporated herein by reference.

BACKGROUND OF THE INVENTION

The present invention relates to an information recording medium such as an optical disk or the like on/from which data can be recorded/reproduced. The present invention also relates to an information recording apparatus and method for recording information on the information recording medium. Furthermore, the present invention relates to an information reproduction apparatus and method for reproducing information recorded on the information recording medium.

As one of information recording media, for example, a phase change type rewritable optical disk is known. When such optical disk is irradiated with a focused light beam, phase change marks are formed on the disk in accordance with changes in intensity of the light beam. That is, by controlling the light beam with which the disk is irradiated in correspondence with given recording data, that data can be recorded on the disk.

When data is reproduced from such optical disk, the optical disk is irradiated with a focused light beam. In this case, the light beam has lower laser power than that upon recording. When the disk is irradiated with the light beam, light reflected by the disk can be obtained accordingly. This reflected light contains components of phase change marks formed on the disk. That is, given data recorded as phase change marks on the disk can be reproduced by detecting this reflected light.

The specifications and merits of a DVD (Digital Versatile Disk)-RAM will be explained below. A rewritable optical disk on which data can be repetitively recorded at an arbitrary position and from which data at an arbitrary position can be reproduced, as described above, is known. As one of such optical disks, an internationally standardized rewritable optical disk (ISO/IEC16824) called a DVD-RAM having a diameter of 120 mm is known. On this DVD-RAM, a zigzag groove (this zigzag pattern will be referred to as a wobble hereinafter) and a flat portion called a land are formed, and data are recorded on both the groove and flat portion. More specifically, data are recorded in units of error correction code blocks (1 ECC block) each of which consists of 16 sectors containing 2,048 bytes per sector as in a DVD-ROM (ISO/IEC16448) as a read-only optical disk.

On this optical disk, address data are recorded in advance in units of sectors (physical sectors). These address data are recorded by embossed pits called CAPA (Complementary Allocated Pit Addresses). This CAPA is formed on a portion between the land and groove so that address information can be extracted even when an optical head is located on either the groove or land. Data are recorded in units of ECC blocks, but are continuously recorded in 16 physical sectors on an actual disk.

The optical disk is segmented into a plurality of zones in the radial direction, and each zone undergoes rotation control at a constant rotational speed. That is, rotation control adopts a ZCLV (Zoned Constant Linear Velocity) scheme. In this scheme, a given zone has equal numbers of sectors per round of a track. Upon comparison between a given zone and its outer neighboring zone, the number of sectors per round of a track in the outer neighboring zone is larger by 1 than that in the given zone. In a single zone, CAPA are aligned in the radial direction. As a result, since no embossed bits are formed in the radial direction of an area where target data is recorded, recording/reproduction can be prevented from becoming unstable due to the influence of embossed pits. However, in a different zone (across zones), CAPA aligned in the radial direction are disconnected. The zone width is determined in consideration of alignment of CAPA and format efficiency. For example, a zone width is determined as a range within which the number of sectors per round of a track does not increase.

In the DVD-RAM, since physical addresses are determined in units of sectors, data can be recorded at an arbitrary address on the disk, and can also be recorded without initialization. Since address information is always obtained in units of sectors, a seek time can be shortened, and if any defect is detected, such defect can be skipped in units of sectors. Hence, the DVD-RAM is suitable for recording random data.

The two-layered recording layer structure will be explained below. As a method of increasing the recording capacity per optical disk, a method of using the two-layered recording layer structure may be used. This follows a single-sided, two-layered structure adopted in a DVD-ROM as a read-only disk. A disk on which two recording layers are formed to be separated by a transparent layer is irradiated with light from a given side, and the light is focused on a desired one of the two recording layers to record data on the target recording layer or to reproduce data recorded on the target recording layer.

Problems of the two-layered recording layer structure will be explained below. In a two-layered disk, upon recording/reproducing data on/from a recording layer on the back side (back recording layer) viewed from the incoming direction of a light beam, a recording/reproduction light beam is transmitted through a recording layer on the front side (front recording layer). If the recording layer on the front side is of a ROM type, data are recorded in advance as embossed pits on the entire front recording layer. For this reason, the transmittance and reflectance of the front recording layer through which light which enters or is reflected by the back recording layer is transmitted is always nearly constant on the entire recording layer. By contrast, in case of a rewritable disk like a DVD-RAM (i.e., when the front recording layer is of a RAM type), an emboss area where data are recorded by embossed pits, a phase change recording area where data are recorded by phase change, and the like are present, and these areas have different transmittances and reflectances. Also, even in the phase change recording area, an amorphous area (recorded area) and crystalline area (non-recorded area) have different transmittances and reflectances. Such differences pose the following problems.

1. When both recorded and non-recorded areas are present on the front recording layer, since the intensity of recording light which is transmitted through the front recording layer and reaches the back recording layer varies between these areas, inter-recording marks formed on the back recording layer by this recording light become uneven, thus impairing recording stability.

2. When both recorded and non-recorded areas are present on the front recording layer, since the intensity of reproduction light, which is transmitted through the front recording layer, reaches the back recording layer, is reflected by the back recording layer, and is transmitted through the front recording layer again, varies between these areas, errors readily occur in a reproduction signal. Furthermore, since the reflectance of the front recording layer changes, a reproduction signal suffers an offset, thus impairing reproduction stability.

An area of the DVD-RAM where embossed pits like CAPA are recorded is an information recording inhibited area, and is always in a non-recorded state. The substrate shape of the CAPA area is an emboss, and has different optical conditions such as scattering of light and the like from those of a recorded area where a groove is formed. That is, such area also has a different transmittance. Furthermore, in case of a DVD-RAM, since CAPA areas are recorded in units of sectors, the innermost zone has 25 CAPA areas per round of a track, and the outermost zone has 59 CAPA areas per round of a track. When the two recording layers having such structures are adhered without any constraints, recording/reproduction stability suffers.

Problems that pertain to format efficiency of a DVD-RAM will be explained below. In a method of recording address data using embossed pits in units of sectors like a DVD-RAM, address fields (header fields), buffer fields, guard fields, and the like are required in units of sectors. The buffer field is formed to absorb a change in actual sector length on the disk, which is caused by rotational variations of the disk, eccentricity upon rotation, and the like. The guard field is formed to cope with random shift of a recording position and deterioration of the leading and trailing ends due to recording. In this manner, the DVD-RAM requires various fields in addition to fields for recording user data. This causes considerable format efficiency drop of the DVD-RAM compared to the DVD-ROM. More specifically, format efficiency of the DVD-RAM is about 10% smaller than the format efficiency of the DVD-ROM.

Problems associated with CAPA in seamless recording will be explained below. On the DVD-RAM, a large zone width is assured to align CAPA, and the recording frequency varies largely between neighboring zones. For this reason, when large-size data such as video data or the like are to be continuously recorded, the time required for switching the recording frequency is required in units of zones. As a result, problems such as transfer rate drop, difficulty in seamless recording, and the like are posed.

The necessity and problems of a training pattern will be explained below. As an optical disk has a higher recording density, and a lens has higher NA, deterioration of a reproduction signal due to the influences of crosstalk between neighboring tracks, intersymbol interference, disk tilt, and the like is not negligible. As a method devised to solve this problem, a waveform equalization condition is determined by reproducing a training pattern as known sequence data on a disk, thus compensating for deterioration of a reproduction signal. Also, a method of measuring any tilt of a disk using such condition and reproduction information itself of known data is available. In these methods, a training pattern must be recorded beforehand on the disk. But when such training pattern is locally inserted in a recording field, the storage capacity decreases. Furthermore, when the training pattern is formed in a recording field, it becomes difficult to specify the position of the training pattern upon recording/reproduction, and such pattern disturbs continuous recording.

Furthermore, a problem of the embossed pit locations of a DVD-RAM will be described below. An information recording method on an optical disk includes a CLV scheme that maintains a constant linear velocity upon scanning a beam spot even at different radial positions of tracks during recording/reproduction, and a CAV scheme that maintains a constant rotational speed of the disk even at different radial positions of tracks during recording/reproduction. In the CLV scheme, an even recording density can be achieved on the entire disk. By contrast, in the CAV scheme, although outer tracks have larger lengths, since inner and outer tracks have equal recording capacity, the recording density lowers toward the outer periphery of the disk. Therefore, if the recording density of an innermost track remains the same, the CLV scheme can assure a larger recording capacity on the whole disk than the CAV scheme. For this reason, a conventional DVD-ROM or the like adopts the CLV scheme. However, a conventional DVD-RAM adopts the ZCLV scheme since it cannot adopt the CLV scheme owing to the problem of the embossed pit locations to be described later.

On the DVD-RAM, neighboring embossed pit sections are aligned in the radial direction so as to inhibit a track that radially neighbors the embossed pit section from becoming a data recorded portion, in consideration of tracking and a problem of signal crosstalk. When neighboring embossed pit sections are juxtaposed in the radial direction, the inner and outer tracks of the disk have the same number of sectors per round of a track. Such locations are the same as those in the CAV scheme. Therefore, in the method of locating the embossed pit sections in this way, the recording density in the track direction lowers toward the outer periphery of the disk. For this reason, the DVD-RAM adopts the ZCLV recording scheme that segments the entire recording layer of the disk into some zones in the radial direction. In the ZCLV scheme, the numbers of sectors per round of a track are equal in each zone, i.e., each zone adopts the CAV scheme, but the number of sectors per round of a track increases in outer zones, thus increasing the recording density. However, in the ZCLV recording scheme, inner zones have lower recording density in the track direction than in outer zones. Furthermore, since the recording frequency between neighboring zones jumps largely, a zone change time is required upon continuously recording large-size data such as video data or the like, resulting in transfer rate drop and difficult seamless recording.

On the DVD-RAM, since each CAPA as address information formed as embossed pits is formed between land and groove tracks, the address information is reproduced at the tail of a beam spot that tracks the land or groove. For this reason, it is difficult to form embossed pits for obtaining a precise reproduction signal, and to adjust an optical head for reading a signal, resulting in an increase in cost.

Since the DVD-ROM and DVD-RAM have considerably different formats due to the different recording/reproduction schemes mentioned above, the load on the apparatus or the like becomes heavy if compatibility is to be assured.

To solve this problem, as a method of recording data without forming address information on an optical disk in units of sectors, a groove on the optical disk is wobbled to record address information as an FM signal, and data are recorded in units of error correction blocks based on the address information, as in, e.g., a CD-R or CD-RW. In a DVD-R, address data is recorded using land prepits which do not impose any influences upon reproduction by a DVD-ROM drive. In either case, since the address of each error correction block is determined only after data is recorded, it is difficult to efficiently record data at an arbitrary position. Also, a recording end process is required after data recording, and dummy data are recorded over several hundred tracks, thus requiring an extra time in data recording. Such recording scheme is suitable for recording continuous data such as video data, but is not suitable for recording small fragments of data such as computer file data.

A group of inventors of the present invention suggests that manages sector addresses using index headers and wobbles before physical formatting, and manages addresses by providing address information in the header of the written recording field after physical formatting or recording. This technique solves the problem of embossed pit locations. However, the present inventors have been studying to further increase the recording density.

In Jpn. Pat. Appln. KOKAI Publication No. 09-27127, a track for one round is broken up into a sector and a plurality of segments which are different from the sector, and segment addresses are recorded in advance in the track. However, with this technique, since the addresses are managed using the sector and segments, management information increases in amount.

BRIEF SUMMARY OF THE INVENTION

The present invention has been made in consideration of the above situation, and has as its object to provide the following information recording medium, information recording apparatus, information recording method, information reproduction apparatus, and information reproduction method:

(1) an information recording medium which has a plurality of recording layers on one surface thereof, and can accurately record and reproduce information on/from all recording layers;

(2) an information recording medium with high recording efficiency and, more particularly, an information recording medium which is suitable for seamlessly recording large-size continuous data such as video data, and for recording small data such as PC data in units of ECC blocks at an arbitrary position;

(3) an information recording apparatus and method for recording information on an information recording medium which has a plurality of recording layers on one surface thereof, and can accurately record and reproduce information on/from all recording layers, so as to fully exploit the characteristics of the information recording medium;

(4) an information recording apparatus and method for recording information on an information recording medium with high recording efficiency and, more particularly, an information recording medium which is suitable for seamlessly recording large-size continuous data such as video data, and for recording small data such as PC data in units of ECC blocks at an arbitrary position, so as to fully exploit the characteristics of the information recording medium;

(5) an information reproduction apparatus and method for reproducing data recorded on an information recording medium which has a plurality of recording layers on one surface thereof, and can accurately record and reproduce information on/from all recording layers; and (6) an information reproduction apparatus and method for reproducing data recorded on an information recording medium with high recording efficiency and, more particularly, an information recording medium which is suitable for seamlessly recording large-size continuous data such as video data, and for recording small data such as PC data in units of ECC blocks at an arbitrary position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 shows the data structure of an index header formed on the optical disk shown in FIG. 1A;

FIG. 17 shows recording fields recorded on the respective tracks of zone 0;

FIG. 21 shows an example of adhesion guide marks formed on the optical disk of the present invention;

FIG. 22 shows a method of using the marks shown in FIG. 21 in the adhering step as a process for manufacturing an optical disk according to the present invention;

FIG. 23 is a schematic block diagram showing an optical disk driving apparatus according to an embodiment of an information recording apparatus and information reproduction apparatus of the present invention;

FIG. 31 shows various parameters in respective zones specified on the optical disk shown in FIG. 28;

FIG. 32 shows recording fields recorded on the respective tracks of zone 0; and

DETAILED DESCRIPTION OF THE INVENTION

The first embodiment of the present invention will be described below with reference to the accompanying drawings.

Figure 1A:
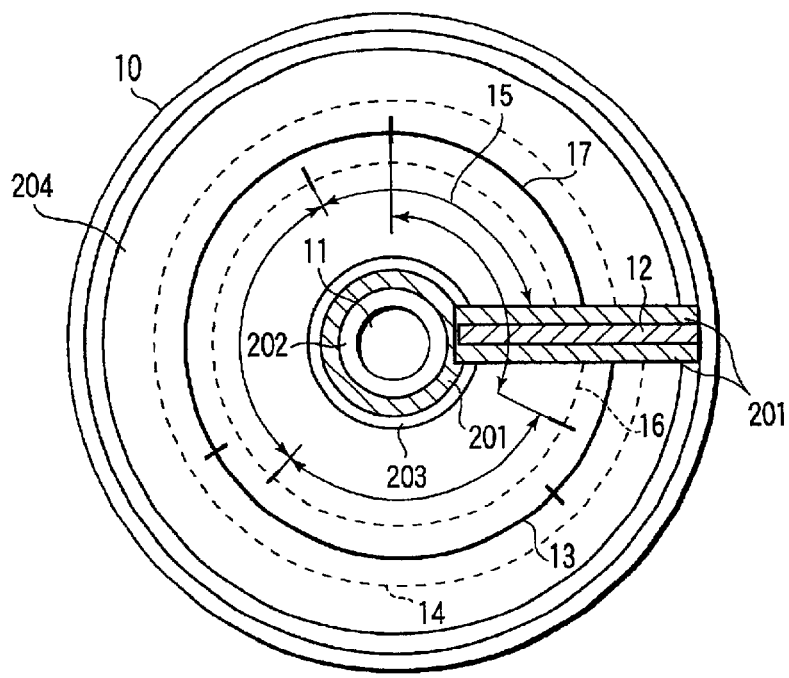
FIG. 1A shows an optical disk according to an embodiment of an information recording medium of the present invention and, more particularly, a spiral track, index header, and dummy areas formed on this optical disk.

FIG. 1A shows a schematic structure of an optical disk (information recording medium) according to an embodiment of the present invention. An optical disk 10 has a plurality of stacked recording layers. On the optical disk 10, a light beam coming from one surface side records data in a spiral track formed on an arbitrarily selected target recording layer, and reproduces data recorded in the spiral track formed on the target recording layer.

Figure 2:
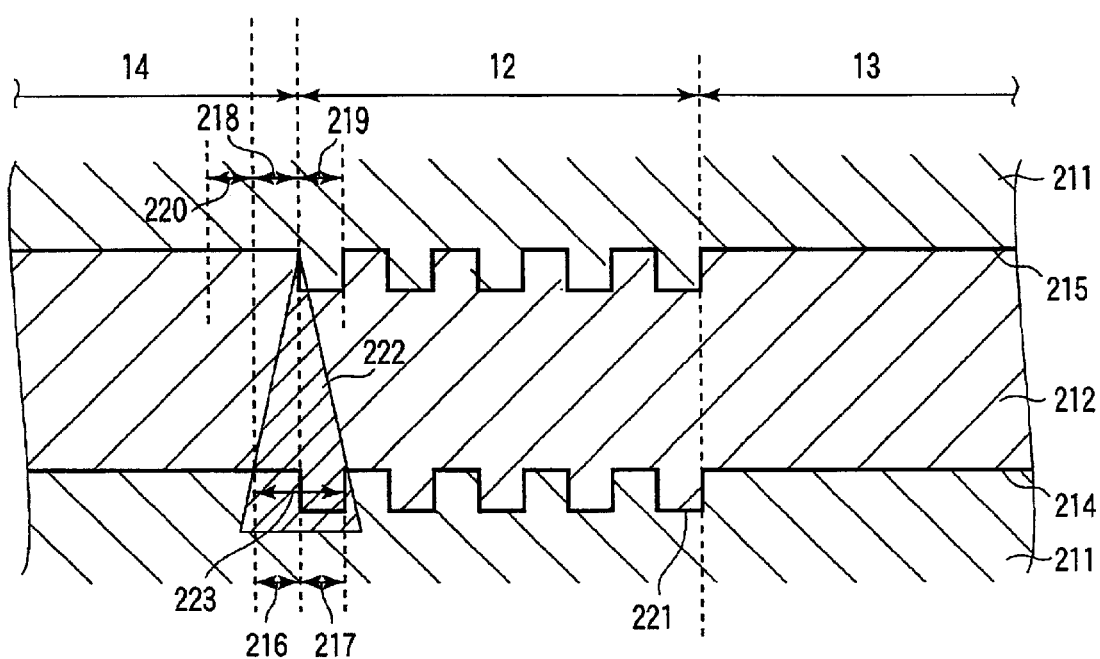
FIG. 2 is a sectional view of an optical disk having no dummy area taken along a track which includes an index header.
Figure 3:
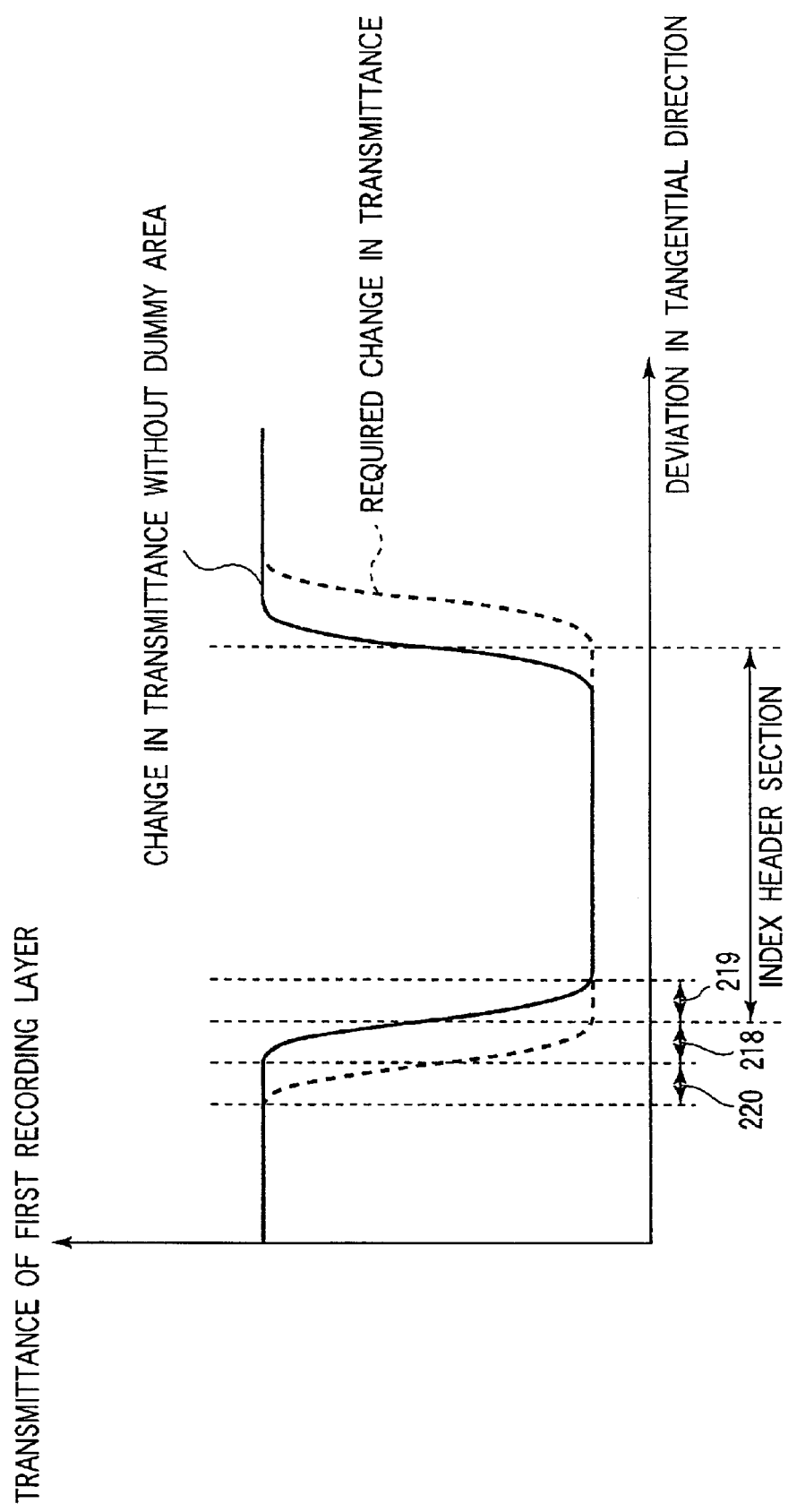
FIG. 3 is a graph showing a change in transmittance of light in a first recording layer upon scanning irradiation light along the track in the section shown in FIG. 2.
Figure 4:
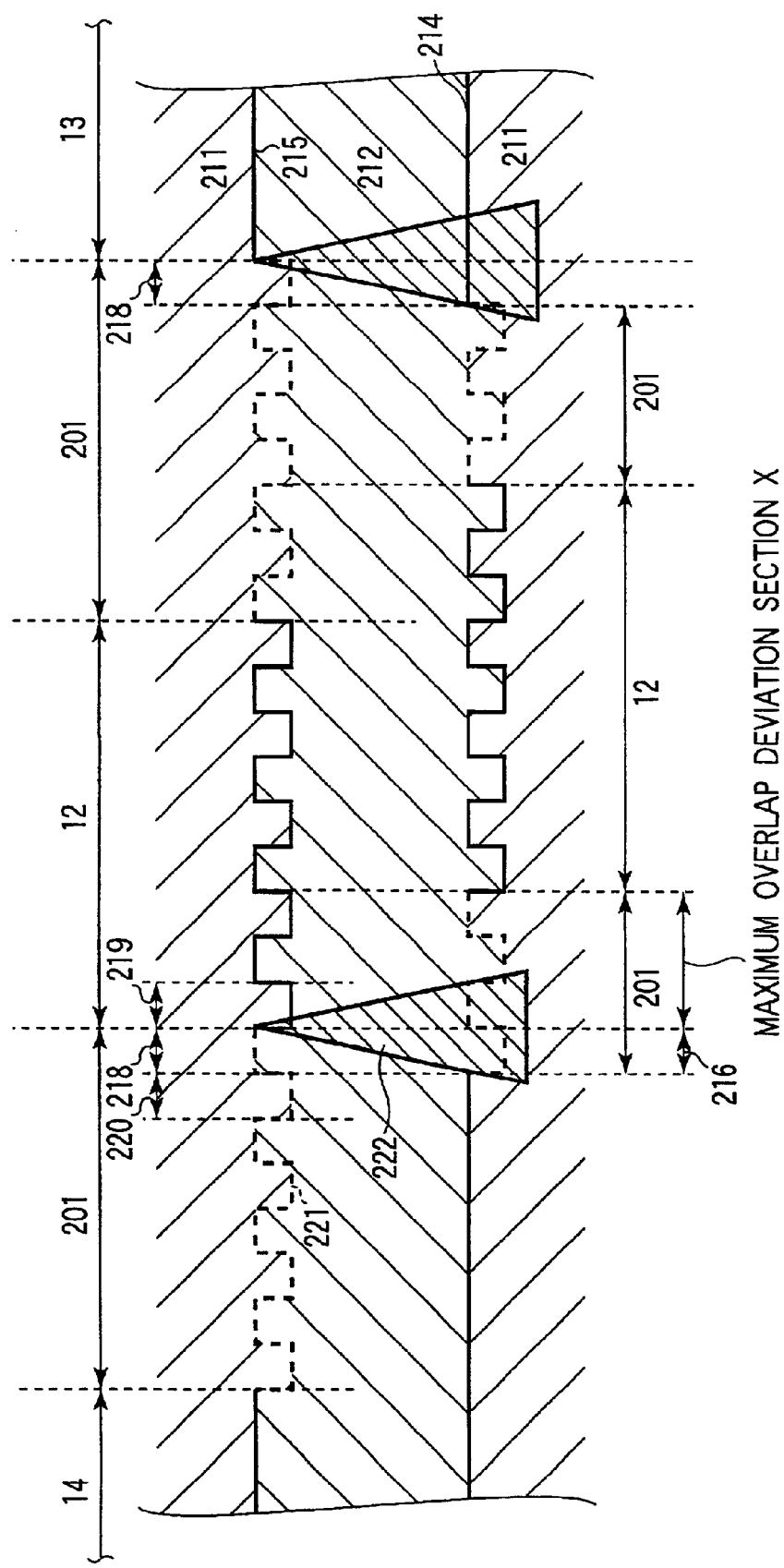
FIG. 4 is a sectional view of the optical disk shown in FIG. 1A taken along a track which includes an index header, and shows an example of the layout of dummy areas.
Figure 5:
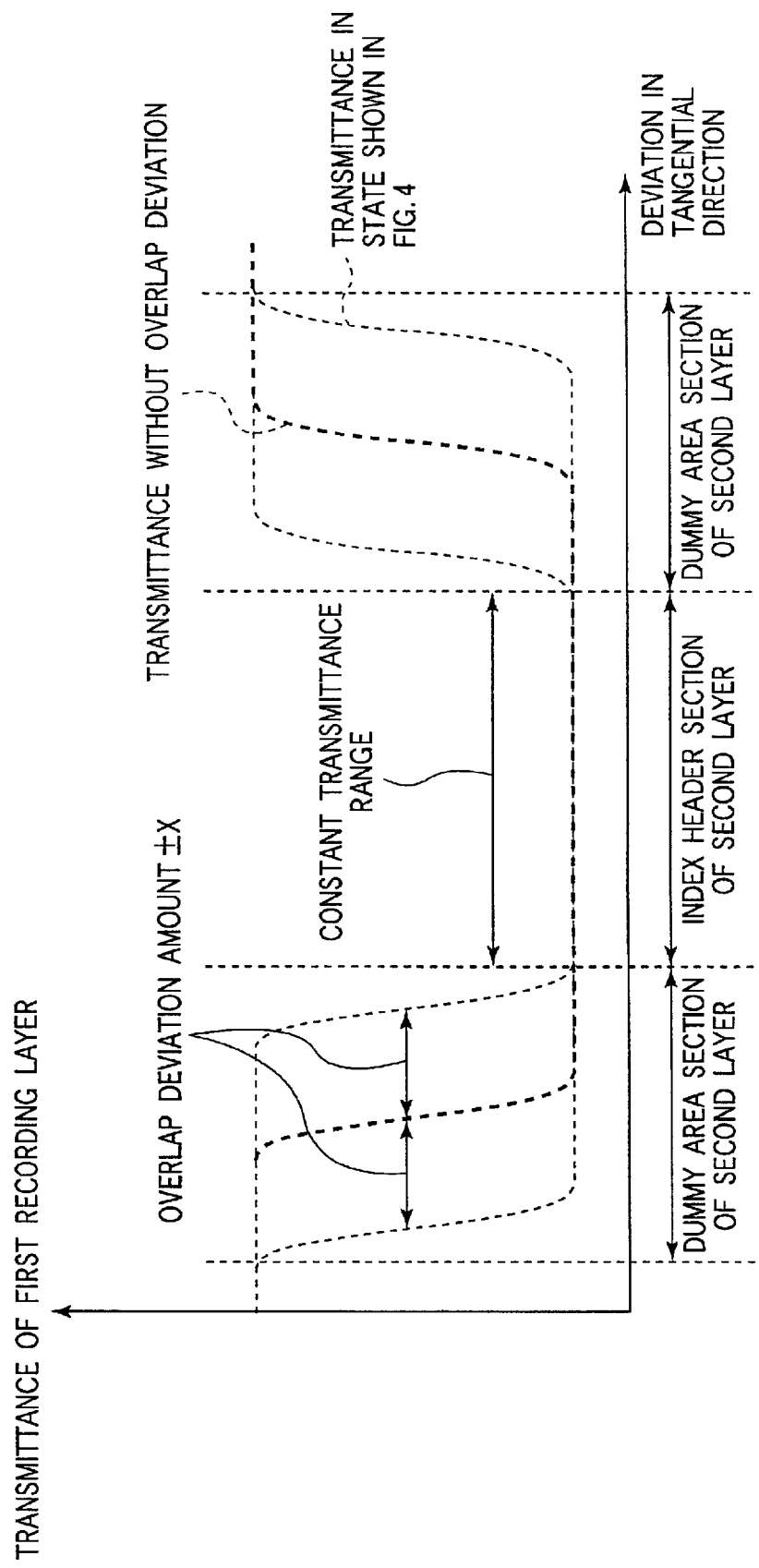
FIG. 5 is a graph showing a change in transmittance of light in a first recording layer upon scanning irradiation light along the track in the section shown in FIG. 4.
Figure 6:
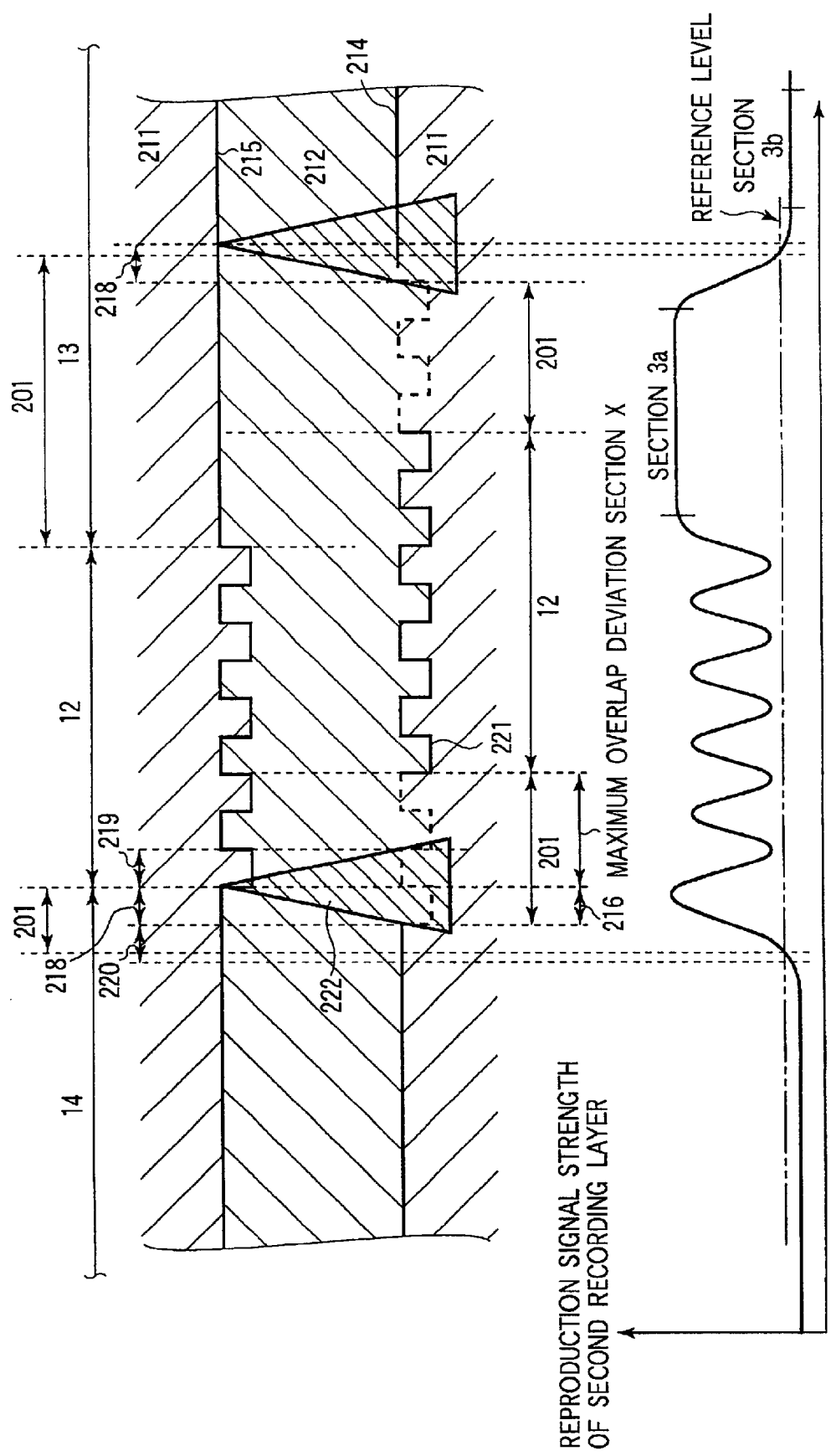
FIG. 6 shows an example of the layout of dummy areas.
Figure 7:
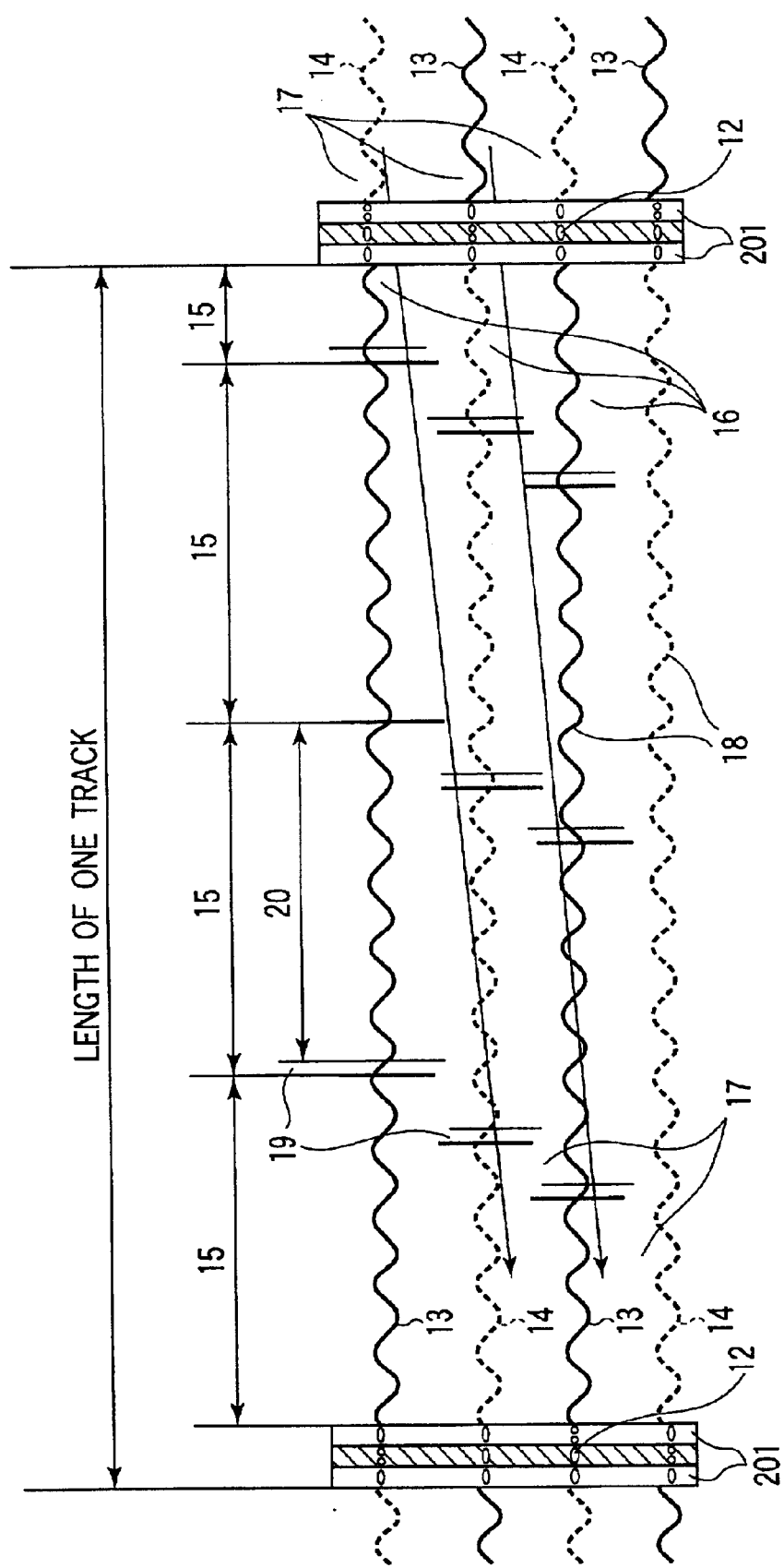
FIG. 7 is an enlarged view of the spiral track, index header, and dummy area formed on the optical disk shown in FIG. 1A, and shows recording fields, sub-recording fields and the like recorded on the spiral track.
Figure 9:
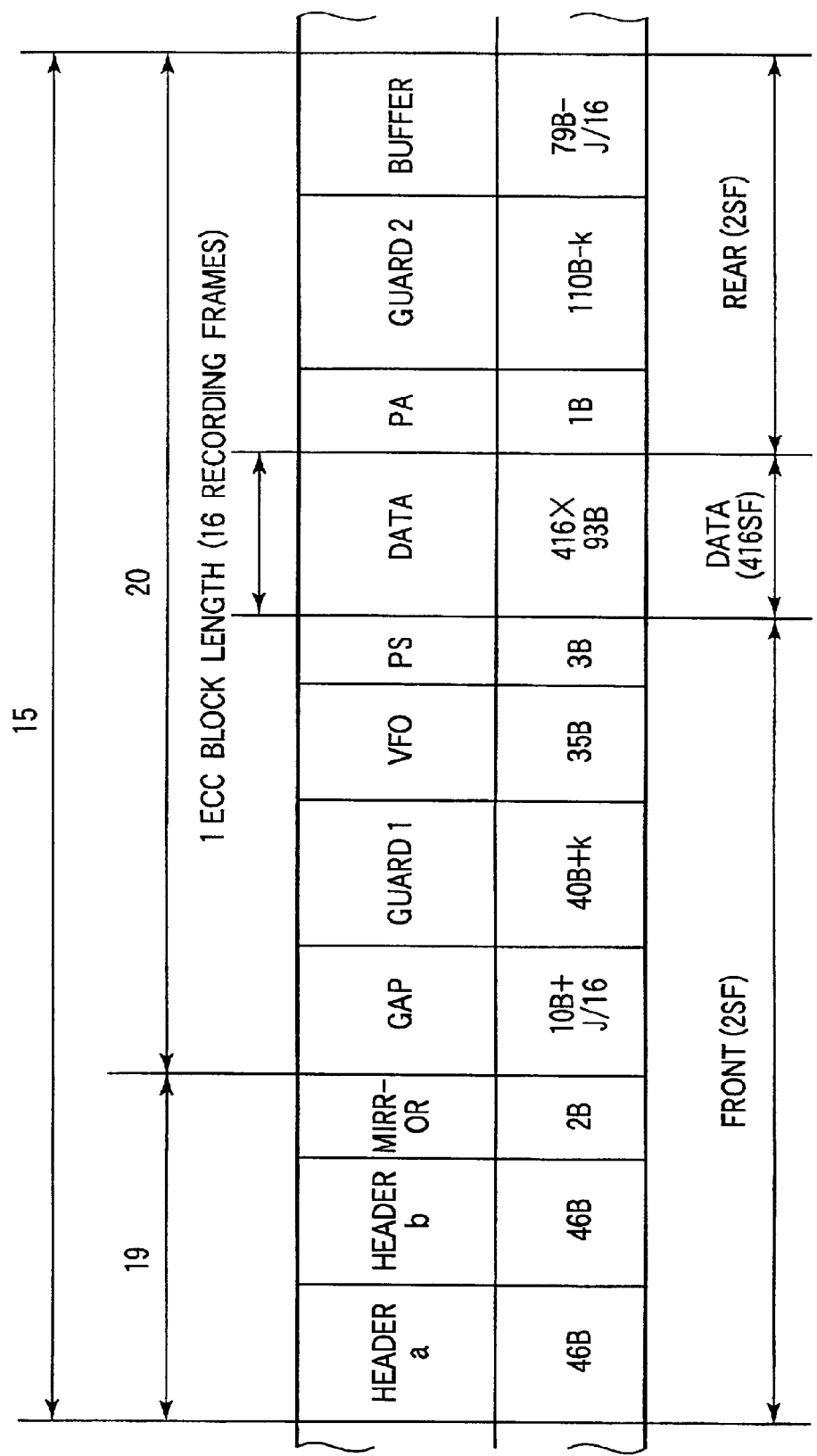
FIG. 9 shows the data structure of data frames that form an ECC block recorded in the recording field and sub recording fields recorded on the spiral track formed on the optical disk shown in FIG. 1A.
Figure 11A:
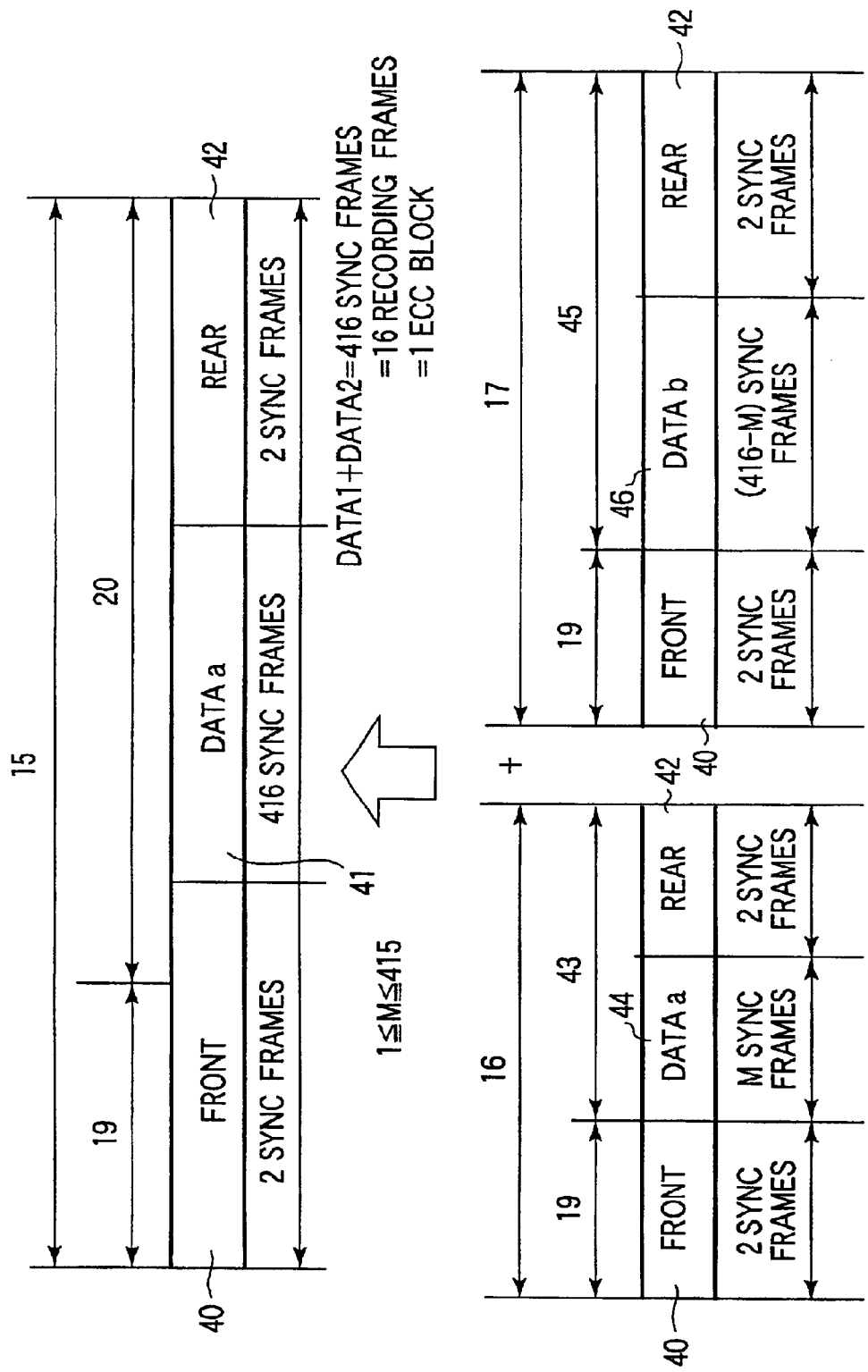
FIGS. 11A and 11B show the relationship between the recording field and sub recording fields recorded on the spiral track formed on the optical disk shown in FIGS. 1A to 1C, and also the data structure (without a connection field) of the sub recording fields.
Figure 11B:
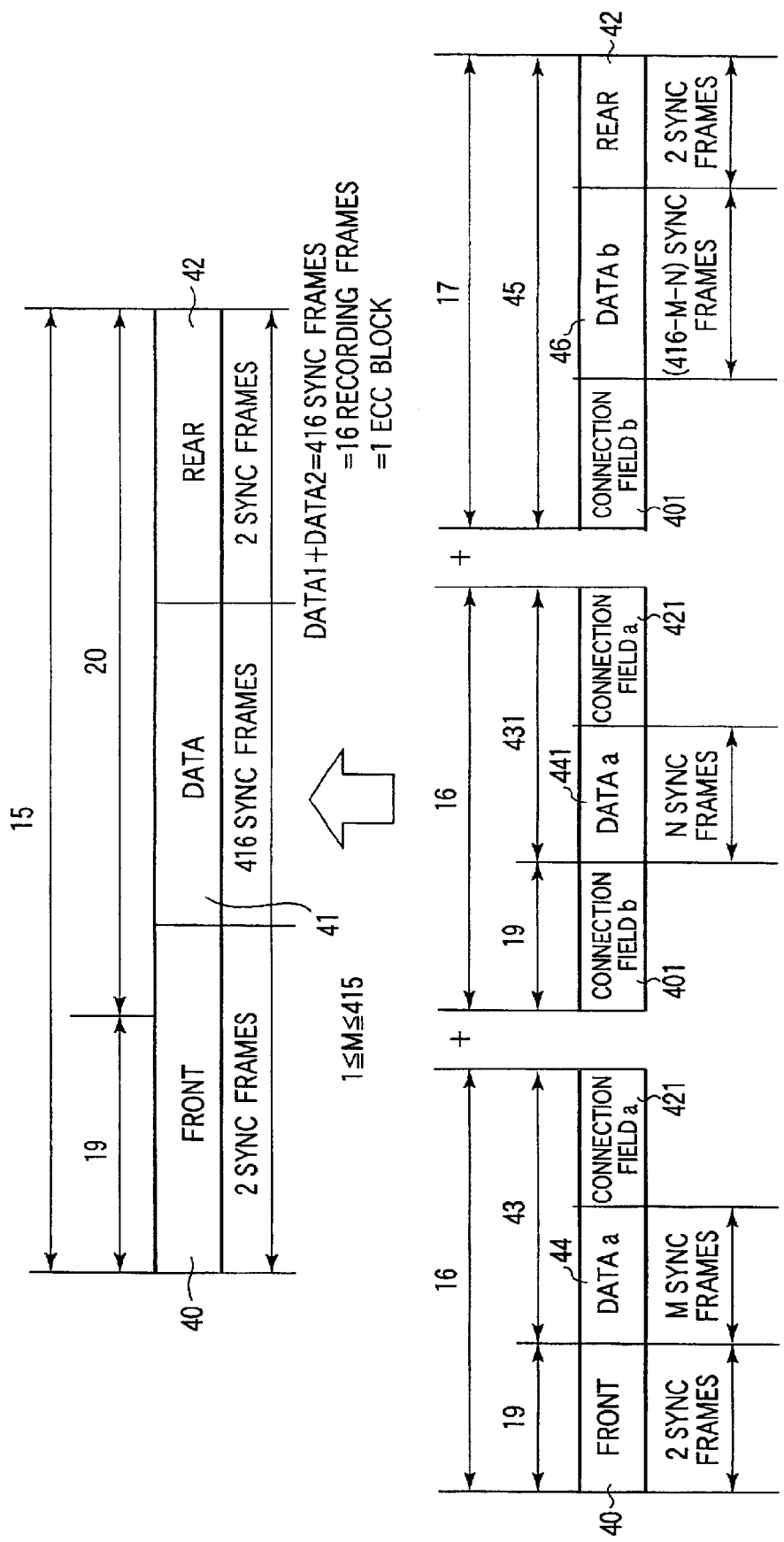

FIG. 2 is a sectional view showing an optical disk having no dummy area 201 taken along a track across an index header. FIG. 3 is a graph showing a change in transmittance of light in a first recording layer 214 when a light beam is scanned along a track while being focused on a second recording layer 215 on the optical disk shown in FIG. 2. FIG. 4 is a sectional view of the optical disk 10 shown in FIG. 1A taken along a track across an index header, and shows the layout of dummy areas. FIG. 5 is a graph showing the layout and a change in transmittance of light in the first recording layer 214 when a light beam is scanned along a track while being focused on the second recording layer 215 on the optical disk 10 shown in FIG. 4. FIG. 6 shows another example associated with dummy areas. FIG. 7 shows the structure of a spiral track. FIG. 8 shows the structure of an index header 12. FIG. 9 shows the structure of a recording field 15. FIGS. 11A and 11B show the relationship between the recording field 15 and sub recording fields.

An outline of a two-layered disk, and the principle of recording/reproduction will be explained below.

The optical disk shown in FIG. 1A has a single-sided two-layered structure in which two phase change recording film layers which are the same as a DVD-RAM are stacked. A transparent intermediate layer 212 is inserted between a lower first recording layer 214 and an upper second recording layer 215. Such optical disk is irradiated with irradiation light 222 from the lower side, and is focused by an objective lens on an arbitrarily selected one of the first and second recording layers 214 and 215. When the selected recording layer is irradiated with strong laser beam pulses, a portion having a high light intensity is converted into an amorphous state, and other portions are converted into a crystalline state, thus writing target data. In this case, if the second recording layer 215 is in focus, since a spot 233 on the first recording layer 214 is defocused and has a low energy density, optical and thermal influences of the light beam on the first recording layer 214 are negligible. The same applies to influences on the second recording layer 215 when the first recording layer 214 is in focus. However, as has been explained repetitively, when the second recording layer 215 is in focus, a change in transmittance of the first recording layer 214 seriously influences recording/reproduction with respect to the second recording layer 215. Also, a change in reflectance of the first recording layer 215 influences an offset of a reproduction signal from the second recording layer 215.

The arrangement of each recording layer will be explained below.

As shown in FIG. 1, each recording layer comprises a lead-in area 203, a lead-out area 204, an information write-once, read-many & rewrite recording area (to be referred to as an information recording area hereinafter), index headers 12, and dummy areas 201. The information recording area comprises a spiral track (recording track) in which groove-shaped groove tracks 13 and land-shaped land track 14 alternately appear every round. The index headers 12 are aligned in the radial direction of the disk to locally intercept the spiral track. The dummy areas 201 are located on one or both sides of the index headers 12, outside an embossed pit area 202 of the lead-in area, and outside the lead-out area 204. Each dummy area 201 is used to adjust the transmittance and reflectance and to inhibit recording, and its range is determined by alignment precision upon stacking layers on the disk, the divergence angle of a beam spot, and the like.

Details of wobbles will be described below.

The spiral track is wobbled by a wobble signal. A plurality of doughnut-shaped zones having different diameters are defined on each recording layer of the optical disk from the inner to the outer periphery side. Each zone includes a predetermined number of rounds of tracks. The number of wobbles per round of the track included in a given zone is determined to be constant. Upon reproducing the optical disk, a reproduction light beam traces the track, the light beam reflected by the track is detected, and data reflected in this reflected light is reproduced. At this time, the reflected light contains wobble components in addition to information of recorded marks and the like. That is, a wobble signal can be extracted by detecting wobble components contained in the reflected light. Based on the extracted wobble signal, a rotation control signal for a spindle motor and a clock signal used upon recording data can be generated. In this manner, accurate recording can be done without being influenced by rotational variations of the motor.

Details of the index headers will be explained below.

The spiral track of this optical disk adopts a land & groove recording scheme which is suitable for high recording density and can record data on both the land and groove tracks. For example, upon tracing the spiral track starting from an index header, an index header and dummy area 201 appear after a groove track for one round, an index header and dummy area 201 appear again after a land track for one round, and a groove track for one round appears. That is, the index headers are aligned on the optical disk at the boundaries between the land and groove tracks so that the index header appears once per round of the track upon scanning the light beam along the spiral track, and a dummy area 201 is located in the neighborhood of each index header.

Figure 1B:
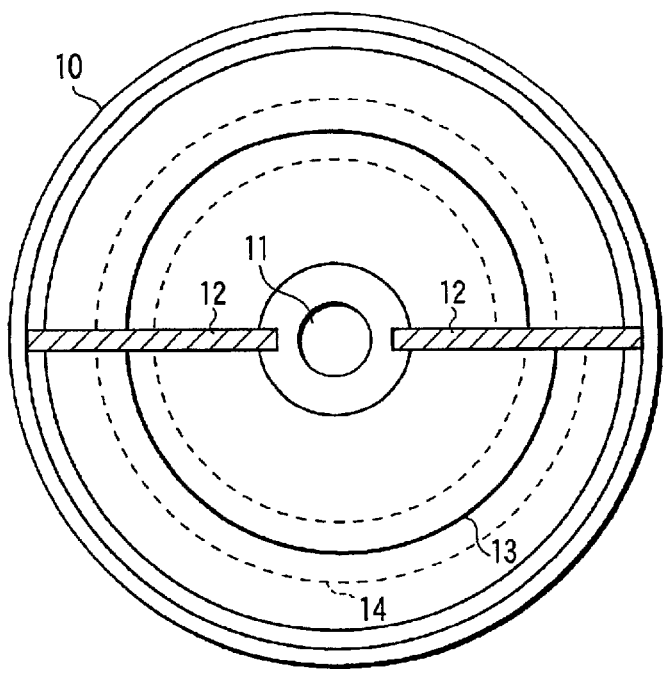
FIGS. 1B and 1C show an optical disk on which a plurality of index headers are formed per round of a track.
Figure 1C:
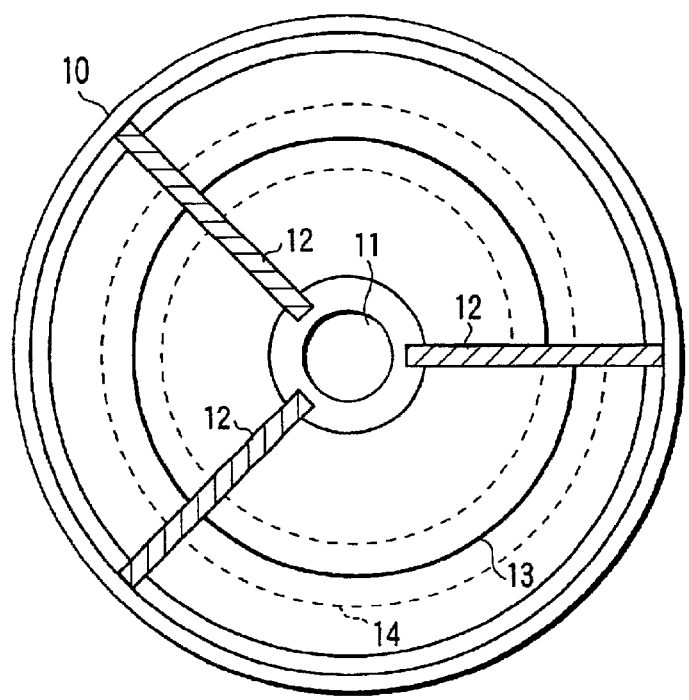

However, the present invention is not limited to this. For example, index headers 12 may be aligned at two positions on the disk so that they appear twice per round of the track upon scanning the light beam along the spiral track (see FIG. 1B). Furthermore, index headers 12 may be aligned at three or more positions on the disk (see FIG. 1C). FIGS. 1B and 1C show states wherein index headers 12 are located at a plurality of positions, and dummy areas 201 are not illustrated. In FIGS. 1B and 1C, index headers 12 and dummy areas 201 are located as in FIG. 1A. As the number of index headers 12 that appear per round increases, reliability upon reading the addresses recorded in the index headers 12 can be improved. Also, when the number of index headers 12 increases, the format efficiency normally drops, but the interval between neighboring index headers 12 can be shortened, and the buffer area width and the like can be shortened accordingly. If each index header 12 consists of 1SF, format efficiency drop can be suppressed.

As shown in FIG. 8, the index header 12 has an Ha header 30, Hb header 31, Hc header 32, and Hd header 33. The Ha header 30 is comprised of a VFO field consisting of a successive pit train used to take PLL synchronization, and an Ha 35 that records a track address. Likewise, the Hb header 31 is comprised of a VFO field and Hb 36. Also, the Hc header 32 is comprised of a VFO field and Hc 37. Furthermore, the Hd header 33 is comprised of a VFO field and Hd 38. The Ha 35, Hb 36, Hc 37, and Hd 38 respectively contain information such as an AM (address mark), PID (physical ID), IED (error detection), PAD (pad), and the like. The VFO fields are formed on every track, but the Ha 35, Hb 36, Hc 37, and Hd 38 may be formed on every other track, as shown in, e.g., FIG. 8. In this case, the Ha 35 and Hb 36 may be formed on a given track, and the Hc 37 and Hd 38 may be formed on a neighboring track. This is to avoid crosstalk from neighboring tracks when the track pitch is formed to be smaller than the spot size of a reproduction light beam.

Alternatively, all the Ha 35, Hb 36, Hc 37, and Hd 38 may be formed on a single track. When two or more headers are formed on each track, even when one header cannot be read due to a defect, the track can be specified using the other header or headers. In this embodiment, four headers are used, but the present invention is not limited to this.

Details of the dummy area 201 (outside each index header) will be explained below.

As a feature of the optical disk, the recording layers are stacked so that index headers overlap each other when viewed from the incoming direction of irradiation light 222, as shown in FIGS. 2 and 4. Note that the overlap between the index headers may deviate within the range of allowable precision, as shown in FIG. 4.

Dummy areas 201 located on the two sides of a given index header will be described in detail below. As described above, the transmittance and reflectance when the recording medium is a recorded mark (amorphous state) are normally different from those when the recording medium is an initial state (crystalline state). In this embodiment, assume that the transmittance of the first recording layer 214 in the amorphous state is higher than that in the crystalline state, and its reflectance is lower than that in the crystalline state. And entire information recording area of the first layer is recorded random data. A case will be examined below wherein the second recording layer 215 is accessed via the first recording layer 214. In the optical disk shown in FIG. 2, the index header area of the first recording layer 214 completely overlaps that of the second recording layer 215. In this case, since the index header area is crystalline state, even when the recording light intensity lowers by the index header area of the first recording layer 214, an influence is small since the second recording layer 215 is not an information recording area. When reproduction light passes through the index header of the first recording layer 214, the intensity of the reproduction light that reaches the second recording layer 215 lowers, and the reflectance from the second recording layer 215 increases, thus increasing an offset of a reproduction signal. However, if a whole defocus spot 223 formed on the first recording layer 214 falls within the index header area, the reproduction signal level does not suffer any transient variation. For this reason, stable reproduction can be done by controlling the offset gain of the reproduction signal. In this case, when the second recording layer 215 is accessed, the spot on the first recording layer 214 is defocused, as shown in FIG. 2. Hence, since the defocus spot 223 partially covers an embossed pit of the first recording layer 215 in a section 2a 218, the recording light intensity lowers and stable information recording is disturbed. On the other hand, since the reproduction light intensity varies during reproduction in the section 2a 218 and a section 2b 219 and the gain control or the like is hardly attained, stable reproduction is disturbed. Especially, the section 2b 219 corresponds to an index header which must always be stably reproduced. To solve this problem, a section 1a 216 of the first recording layer 214 is specified as a dummy area 201 to have the same transmittance and reflectance as those of the index header. As a result, during reproduction of the index header of the second recording layer 215, the reproduction light intensity can be made constant. Furthermore, a section 2c 220 and 2a 218 of the second recording layer 215 where the recording light intensity drop occurs is specified as a dummy area 201, i.e., a recording inhibition area of user information in advance. As a result, the information recording area of the second recording layer 215 does not suffer any recording light intensity drop.

Furthermore, a case will be examined below wherein the overlap between index headers deviates, as shown in FIG. 4. Assume that the index header of the first recording layer 214 deviates a maximum of X from that of the second recording layer 215. If such deviation occurs, a portion of the first recording layer 214 which was an index header so far becomes an information recording area in an overlap deviation section when viewed from the second recording layer 215, and the transmittance becomes higher than that when that portion is an index header. Therefore, the dummy area 201 must be extended by this section to set the transmittance to be equal to that of the index header area. Since the overlap may deviate either before or after an index header, dummy areas 201 having the same length must be located on the two sides of the index header. Furthermore, when the dummy area 201 of the first recording layer 214 is extended in this way, the second recording layer 215 suffers recording light intensity drop over a broader range than before extension. Therefore, a range where the recording light intensity drop may occur shown in FIG. 5 is specified as a dummy area 201 to inhibit user information from being recorded. As a result, the information recording area of the second recording layer 215 does not suffer any recording light intensity drop.

Hence, in order to maintain constant the intensity of reproduction light during reproduction of the index header of the second recording layer 215, dummy areas 201 each having a width specified by (width half the defocus beam spot 223 formed on the first recording layer 214 when the second recording layer 215 is in focus)+(maximum overlap deviation width) must be located on the two sides of each index header of the first recording layer 214 to set the transmittance and reflectance to be equal to that of the index header. In order to avoid the recording light intensity drop on the recording area of the second recording layer 215, dummy areas 201 each having a width twice that of the first recording layer must be located on the two sides of each index header of the second recording layer 215 to form information recording inhibition areas.

In the above description, dummy areas 201 having the same width are located on the two sides of each index header of the first recording layer 214. Since the transmittance and reflectance of the index header are equal to those of the dummy area 201, the index header of the first recording layer 214 need not be located at the center of the range including the index header and dummy areas as long as the total width of the index header and dummy areas 201 is equal to that of the second recording layer 215. That is, the right and left dummy areas 201 may have different widths. However, as for the index header of the second recording layer 215, dummy areas 201 on the two sides must have equal width since the first recording layer 214 must have a uniform transmittance.

In an optical disk apparatus in which the reproduction signal level from the second layer 215 is maintained constant even when the reproduction light intensity has changed due to a change in transmittance of the first recording layer 214 by controlling the reproduction gain, the need for dummy areas 201 of the first recording layer 214 can be obviated. At this time, to cope with a change in recording light intensity, dummy areas 201 each having a width specified by (width half the defocus beam spot 223 formed on the first recording layer 214 when the second recording layer 215 is in focus)+(maximum overlap deviation width) are formed on the second recording layer 215 to define information recording inhibition areas there.

When the areas of the information recording areas of the first and second recording layers 214 and 215 are set to be equal to each other, two areas each having a width specified by (width half the defocus beam spot 223 formed on the first recording layer 214 when the second recording layer 215 is in focus)+(maximum overlap deviation width) of the first recording layer 214 must cease to be information recording areas, but the transmittance of the areas must be equal to that of the information recording area.

Another dummy area layout method will be explained below using FIG. 6. AS shown in FIG. 6, dummy areas 201 are formed on the first recording layer 214 as in FIG. 4. On the second recording layer 215, index headers 12 and tracks are formed. The lower graph in FIG. 6 shows a change in reproduction signal from the second recording layer 215 when the second recording layer 215 is in focus. When the position on the first recording layer 214 moves from a track (recording field) to an embossed pit (dummy area and index header), the offset of the reproduction signal from the second recording layer 215 changes. That is, the reproduction signal changes during sections 3a and 3b even though an identical track is reproduced. Hence, such track of the second recording layer 215 corresponding to the range where the optical characteristics of the first recording layer 214 are different from those of the recording field 15 is specified as a dummy area 201 and a write to the recording field 15 is inhibited in this area. Alternatively, a signal such as VFO or the like, which is different from user data, may be recorded there to generate a sync signal or to control the reflectance. In this manner, the total area of the dummy areas 201 of the second recording layer 215 can be suppressed to be equivalent to that of the first recording layer 214. In this case, the widths of right and left dummy areas 201 corresponding to a given index header 12 of the second recording layer 215 change depending on the deviation produced upon adhering the recording layers.

Therefore, an area in which information indicating the positions of the dummy areas 201 of the second recording layer 215 is assured in the lead-in area 203 on this disk. Once the disk is reproduced, those ranges of the second recording layer 215, which serve as dummy areas 201 are detected from the signal shown in the lower graph in FIG. 6, and that information is recorded in the lead-in area 203. More specifically, this information indicates the number of wobbles or time duration from a given index header. The position of each recording field 15 can be specified based on this result.

The lead-in area 202 and lead-out area 204 will be explained below. Dummy areas 201 of the lead-in area 202 and lead-out area 204 will also be explained.

On a DVD-RAM, the lead-in area ranges from the radial position of 22.59 mm to 24.101 mm. Of this range, an embossed pit & mirror field ranges from 22.59 mm to 24.000 mm, and the remaining area is used as a rewritable area. The lead-out area 204 ranges from 57.889 mm to 58.493 mm, and is entirely used as a rewritable area. The embossed area 202 of the lead-in area records a reference code and control data. The rewritable areas of the lead-in area and lead-out area 204 have a DMA, disc identification zone, guard track zone, drive test zone, and disc test zone. Since the disk of the present invention has a plurality of recording layers, each recording layer has the lead-in area and lead-out area 204, as shown in FIG. 1A. The embossed pit & mirror field of the lead-in area ranges from 22.59 mm to 24.000 mm as in the DVD-RAM. The overlap between the embossed pit & mirror fields of the first and second recording layers 214 and 215 deviates due to a deviation upon adhering recording layers and eccentricity of each recording layer. In consideration of such deviation, an area from 24.000 mm to 24.070 mm of the first recording layer 214 is defined as a dummy area 201. Furthermore, an area from 24.070 mm to 24.101 mm is defined as the rewritable area 203 of the lead-in area. On the second recording layer 215, an area from 24.000 mm to 24.140 is defined as a dummy area 201, and an area from 24.140 mm to 24.170 mm is defined as the rewritable area 203 of the lead-in area. As a result, the embossed pit area of each lead-in area can be stably reproduced. An area from 57.889 mm to the outermost periphery of each layer is defined as the lead-out area 204. At this time, a dummy area 201 may be formed outside the lead-out area 204. However, since this area has no embossed pit area, no dummy area 201 of the first recording layer 214, which is used to uniform the reproduction light intensity, is required. The overlap of the outermost periphery of the disk may deviate, but a guard track zone can be used as a dummy area 201 required for the second recording layer 215.

Furthermore, as another method, a lead-in area may be formed on the inner periphery side of the first recording layer, the lead-out area may be formed on the inner periphery side of the second recording layer, and a middle area may be formed on the outer periphery side of each recording layer. In this case, that range of the second recording layer, which is influenced by transmittance drop by the embossed pit & mirror field of the lead-in area is defined as a dummy area to inhibit recording or as a guard track zone.

Details of the recording field will be described below.

Data to be allocated on the spiral track will be explained. When data is recorded on the first or second recording layer 214 or 215, a predetermined number of recording fields 15 where data are rewritable are recorded on the spiral track. As shown in FIGS. 7 and 9, each recording field 15 is comprised of a header field 19 for storing address data of the recording field 15, and a data field 20 for storing various data. The recording field 15 records data for one ECC block. The ECC block will be described later. Once an address is recorded in the header field 19 upon, e.g., formatting, the address recorded in the header field 19 is never rewritten unless the disk is re-formatted. The contents of the data field 20 are rewritten every time a write is made.

When the recording fields 15 are successively recorded on the track, one recording field 15 may cross an index header 12, as shown in FIG. 7. That is, one recording field 15 formed by a predetermined track length is broken up into two recording fields across the index header 12 and dummy areas 201. These two divided recording fields will be referred to as sub recording fields a 16 and b 17 hereinafter.

As described above, each recording field 15 is comprised of a header field 19 for storing its own address, and a data field 20 for storing various data.

Figure 10:
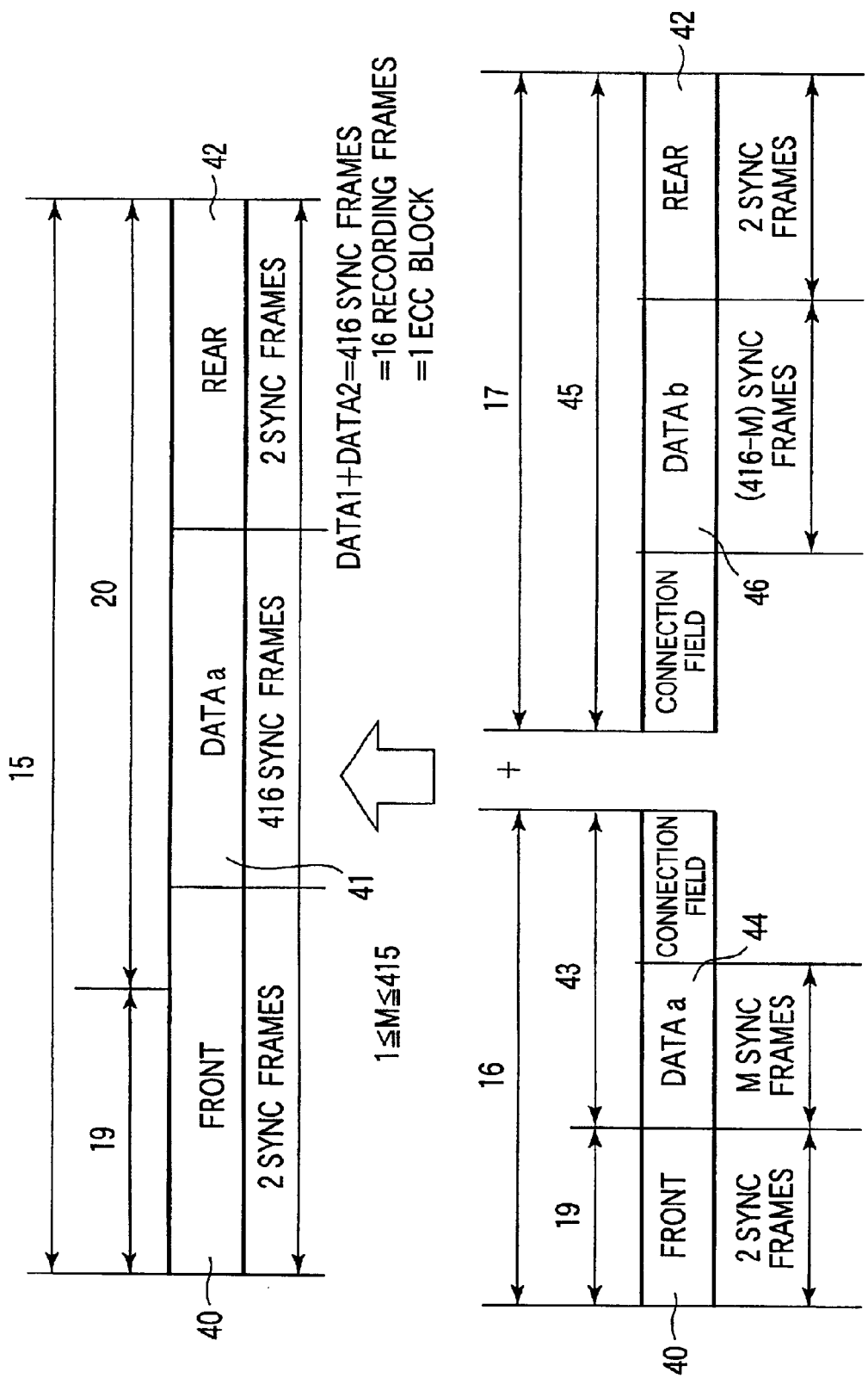
FIG. 10 shows the relationship between the recording field and sub recording fields recorded on the spiral track formed on the optical disk shown in FIG. 1A, and also the data structure of the sub recording fields.

As shown in FIG. 10, the sub recording fields a 16 and b 17 comprise connection fields for connecting the two sub recording fields. In the connection field of the sub recording field a 16, for example, PA (postamble) is set. A guard field or buffer field may be set instead. In the connection field of the sub recording field b 17, for example, PS (presync) is set. In addition, GAP, guard field, or VFO field may be set. If the connection fields of the sub recording fields a 16 and b 17 respectively have the same structures as a rear and front of the recording field, each of the sub recording fields a 16 and b 17 comprises a header field 19 and a sub data field 43, as shown in FIG. 11A. The header fields 19 of the sub recording fields a 16 and b 17 can store identical address data to improve reliability upon recording/reproducing data. Data for one ECC block to be recorded in the sub recording fields a 16 and b 17 is divisionally recorded in the sub data fields 43 and 45 of the sub recording fields a 16 and b 17.

Furthermore, when a plurality of index headers 12 appear per round or when an ECC block is formed in units of 64 k to increase the data size of the recording field 15, one recording field 15 may extend across two or more index headers 12. In such case, the recording field 15 is broken up into three or more sub fields, as shown in FIG. 11B. At this time, connection fields a 421 and b 401 may have the same structures as a rear 42 and front 40 of the recording field 15.

The format of the recording field will be described below.

FIG. 9 shows details of the recording field 15. The header field 19 is made up of two headers, i.e., headers a and b, and a mirror field. Each header consists of 46 bytes, and its structure is the same as that of each header of the index header. The mirror field is used to detect the boundary between the header and data fields. Once a header field is recorded, it is never rewritten unless the optical disk 10 is re-formatted. Once a header field is recorded, the address of each recording field is determined from this header, and the index headers and wobbles are used as auxiliary address data.

The data field 20 is made up of GAP, Guard1, VFO, PS, DATA, PA, Guard2, and Buffer. GAP is used to control laser power at the beginning of recording and to randomly shift the recording positions. J stores a random number ranging from 0 to 15 every time data is rewritten. GAP normally records the same signal as that in, e.g., VFO. Guard1 is a measure taken against deterioration that appears at the leading edge of a recorded signal after recording is repeated a large number of times. K stores a random number ranging from 0 to 7. Guard1 normally records the same signal as that in, e.g., VFO. VFO stores a PLL sync signal, PS stores a pre-sync signal, and DATA stores data for one ECC block. PA is a postamble. Guard2 is a measure taken against deterioration that appears at the trailing edge of a recorded signal. K stores a random number ranging from 0 to 7, and the same K value as that of Guard1 is used. Guard2 normally records the same signal as that in, e.g., VFO. Buffer is used to absorb different recording field lengths due to eccentricity of the disk and rotational variations of the disk, and to randomly shift the recording positions. Buffer has an area of at least 2 bytes or more where no signal is recorded. J assumes a value ranging from 0 to 15, and the same value as J of GAP is used.

Formatting and an actual recording method will be explained below. A sequence for recording the recording fields on the spiral track of the optical disk will be described.

In general, an optical disk on which data is recorded undergoes annealing called initialization after the manufacture of the disk, and a recording film is converted into a crystalline state. After that, the disk is inspected to check for its defects, and is then physically formatted. In defect inspection, specific data is written on the entire disk to detect errors, and a recording field 15 including an uncorrectable error or a recording field 15 having a predetermined number of errors or more is replaced by another recording field 15 free from any error. This operation requires a long period of time since the entire surface of the disk undergoes recording and reproduction although it is done for the purpose of defect inspection of the disk, resulting an increase in cost of the disk.

Hence, large defects are checked by another efficient method (checked by scanning a large beam spot), and a checking process by writing data may be done only for an area where directories are recorded or may not be done at all in some cases.

In a DVD-RAM, one recording field 15 (one ECC block) is broken up into 16 physical sectors upon recording. Since each physical sector is formed with address data, data can be recorded in an arbitrary recording field. Since all physical addresses are determined as a default unless defect management is made, data can be recorded in an arbitrary recording field 15 without physical formatting. This is one feature of the DVD-RAM.

On the other hand, on the optical disk 10 of the present invention, since track address data are recorded in the index headers 12, all track addresses are determined by reading the index headers 12. In an initial state, no recording fields 15 are formed. Hence, no header fields having addresses of the recording fields are recorded. However, since the positions of all recording fields can be determined by the index headers 12 and the number of wobbles formed on the recording tracks, data can be written in an arbitrary recording field 15 by detecting the index header 12 and a wobble signal.

When an optical disk is used to record computer data, data is normally recorded on the entire recording layer and defect management is done. In such case, the optical disk 10 of the present invention undergoes a write of all recording fields 15, i.e., physical formatting. That is, the recording fields 15 are recorded on the entire surface of the optical disk, and header and data fields 19 and 20 are recorded at that time. If one recording field crosses an index header 12, as described above, it is broken up into two sub recording fields when it is recorded.

When recording fields 15 are recorded for the first time upon, e.g., physical formatting, header a to Guard2 in each header field 19 in FIG. 9 are successively recorded. In the second or subsequent recording, GAP to Guard2 are rewritten. In practice, the same signal as in VFO is recorded from halfway through the GAP field, and recording comes to an end in Gaurd2. Therefore, the recording field includes a signalless area of 2 bytes or more in at least the mirror field and Buffer field.

An ECC block will be described below taking a DVD as an example.

Figure 12:
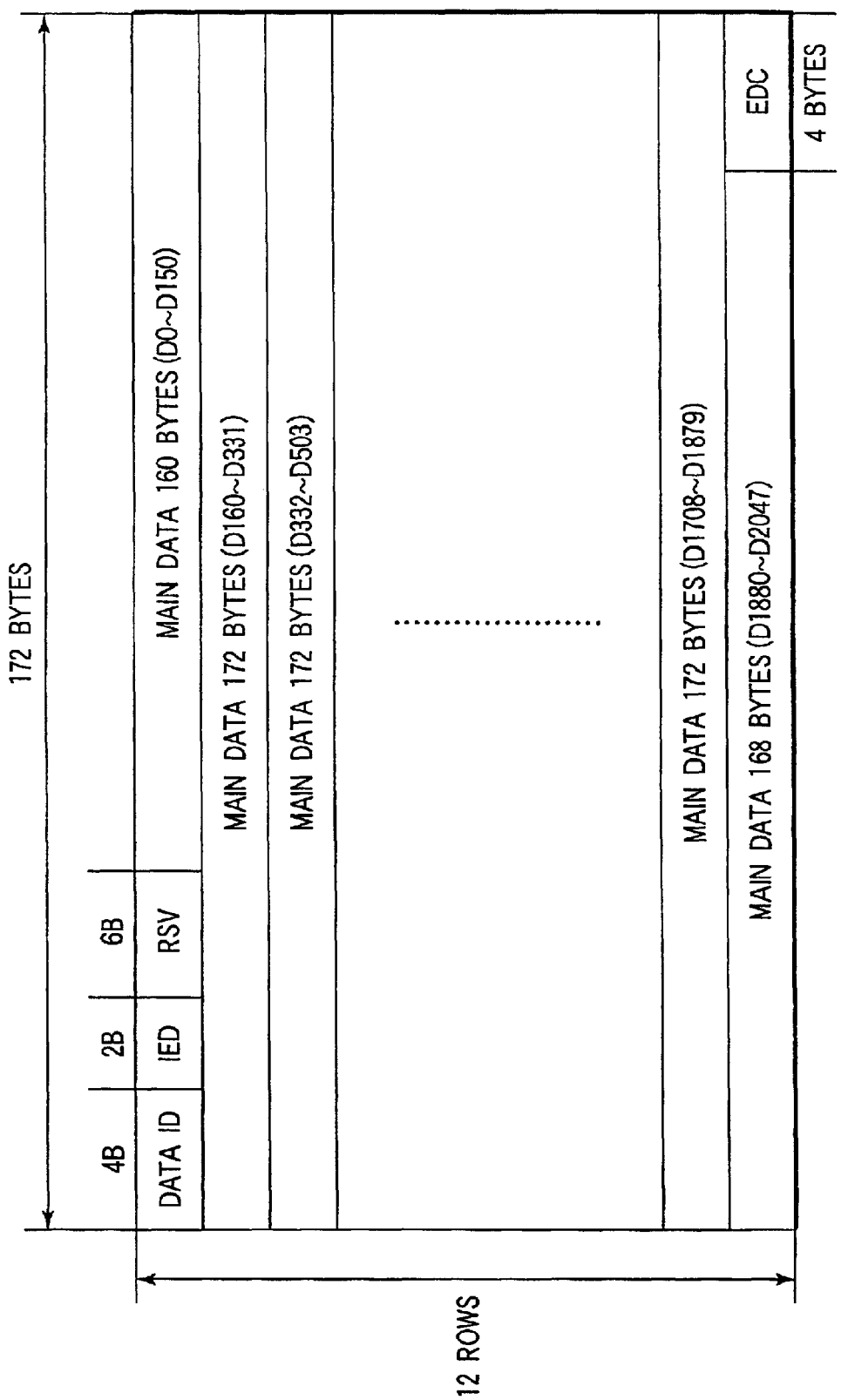
FIG. 12 shows the data structure of data frames that form an ECC block recorded in the recording field and sub recording fields recorded on the spiral track formed on the optical disk shown in FIG. 1A.
Figure 13:
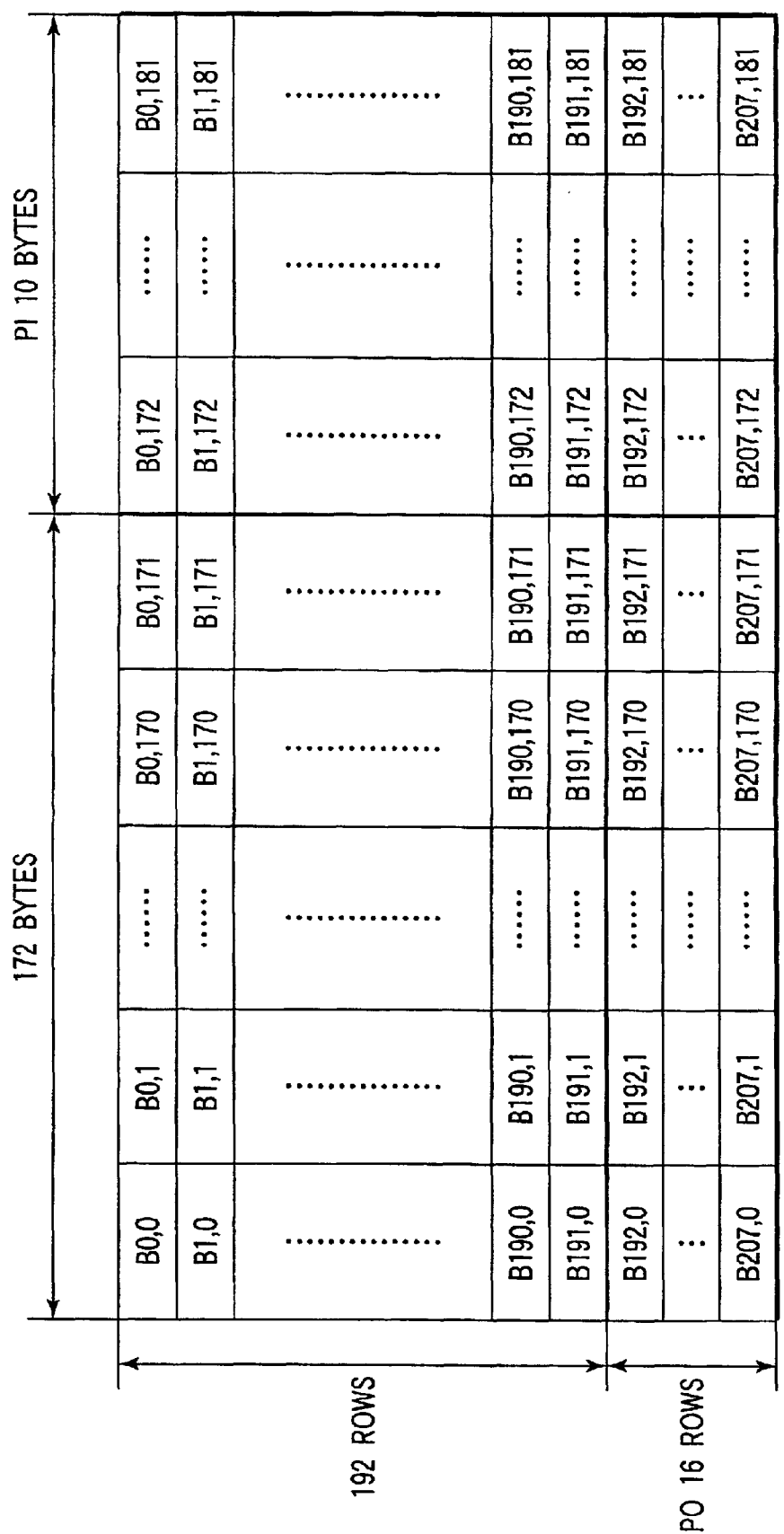
FIG. 13 shows the data format of an ECC block recorded in the recording field and sub recording fields recorded on the spiral track formed on the optical disk shown in FIG. 1A.

FIG. 12 shows the structure of a data frame consisting of 172 bytes×12 rows (2,064 bytes). This data frame consists of 2,048-byte main data, a 4-byte data ID indicating the ID of the data frame, a 2-byte IED used to detect any errors from this data ID, a 6-byte RSV as a reserve field, and a 4-byte EDC used to detect any errors from the main data. The main data is scrambled to prevent "0" or "1" runs.

Figure 14:
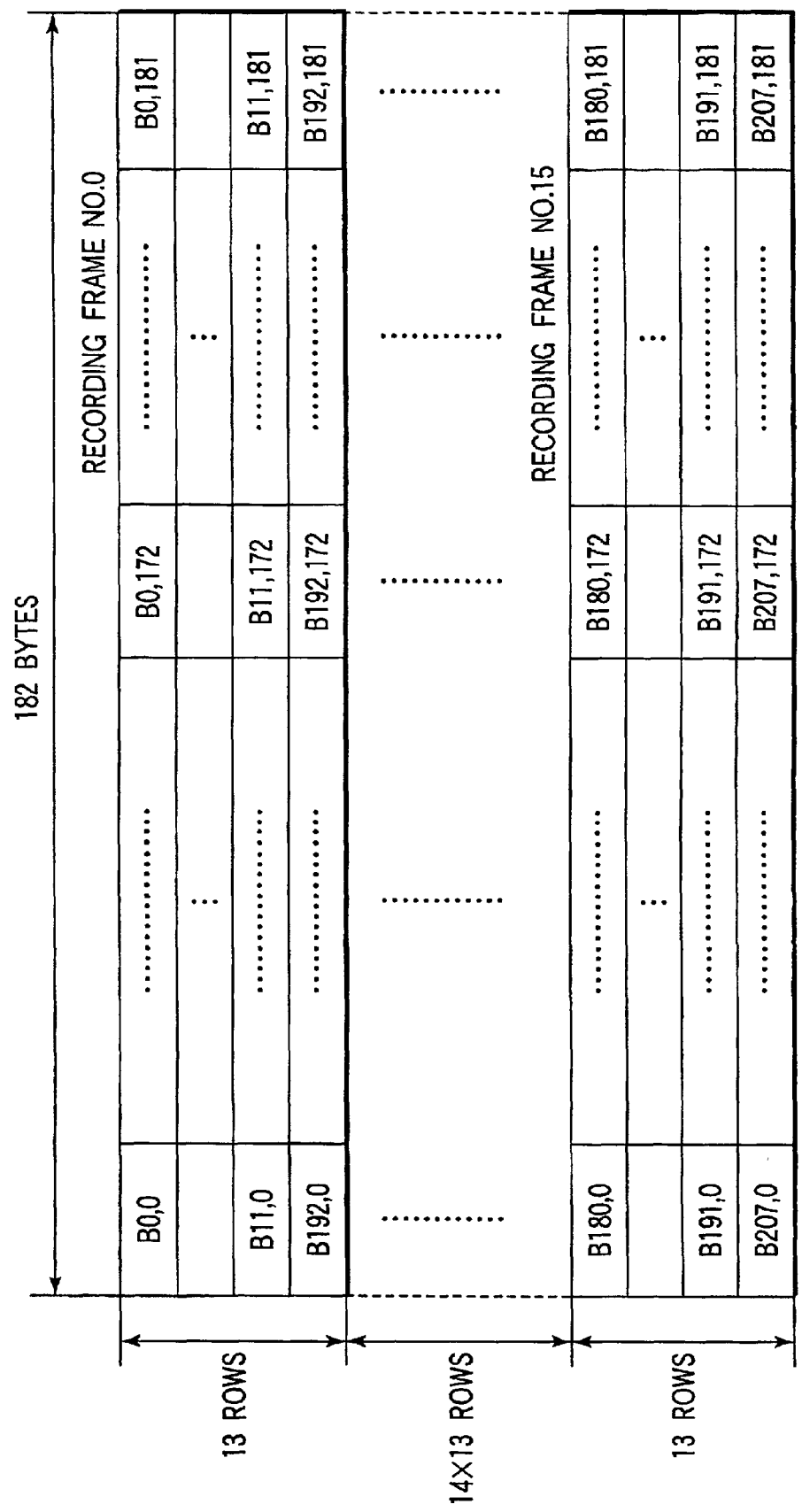
FIG. 14 shows the data structure of an interleaved ECC block recorded in the recording field and sub recording fields recorded on the spiral track formed on the optical disk shown in FIG. 1A.

The ECC block used as a recording unit of a DVD (ROM and RAM) is made up of 16 data frames including scrambled main data, and consists of 172 bytes×192 rows, as shown in FIG. 12. In addition to these data frames, as error correction codes, a 10-byte inner code PI is appended to each row and a 16-row outer code PO to each column. Hence, the entire ECC blocks consists of 182 bytes×208 rows. In order to improve correction performance of block errors, the ECC block is broken up into 16 interleaved recording frames each including PO for one row, as shown in FIG. 14.

Figures 15, 16:
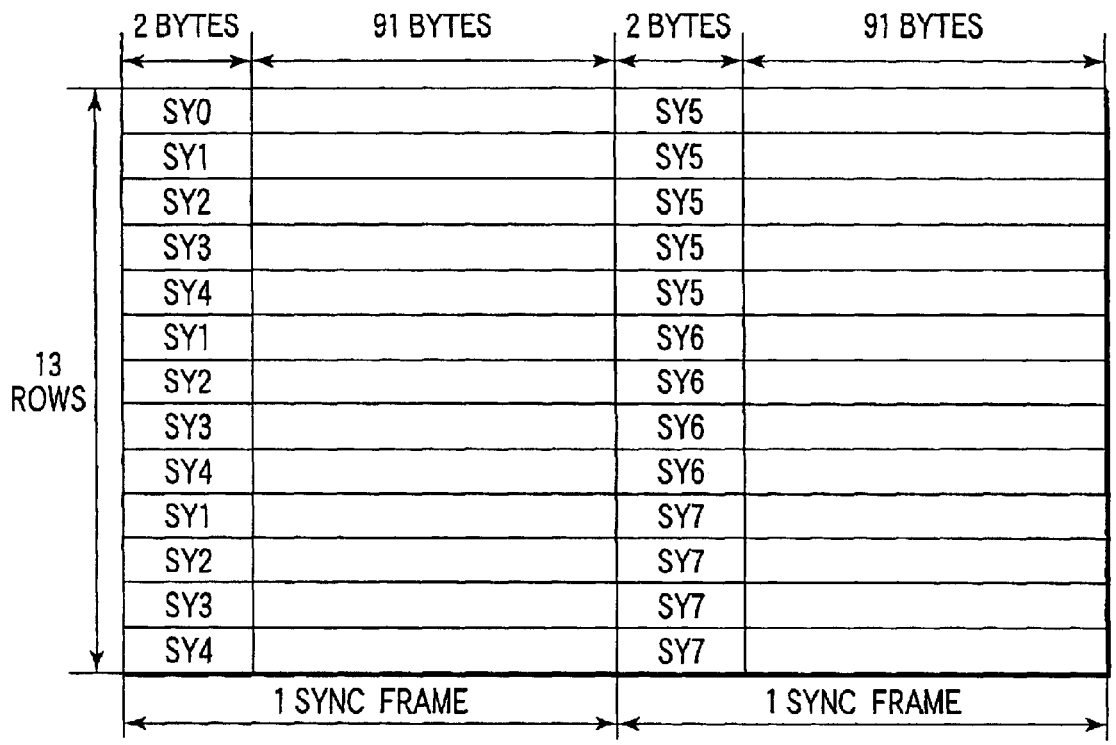
FIG. 15 shows the data structure of recording frames after sync codes (2B) are appended.
FIG. 16 shows various parameters in respective zones specified on the optical disk shown in FIG. 1A.

The recording frames undergo 8–16 modulation in units of rows, and 2 sync bytes are appended thereto every 91 bytes, as shown in FIG. 15. As a result, the recording frame has two 93-byte sync frames per row, and consists of a total of 26 sync frames (2,418 bytes).

On a DVD-ROM, these 26 sync frames that form one recording frame and 16 recording frames that form one ECC block (38,688 bytes) are successively arranged on the track. At this time, the format efficiency is 84.7%.

On the other hand, on a DVD-RAM, these 26 sync frames are recorded in one physical sector. Each physical sector has a structure similar to that shown in FIG. 9, and consists of a 130-byte header field and a 2,567-byte recording field. Since the total length of each sector is 2,697 bytes (29 sync frames) that include 2,048 bytes of data, the format efficiency is 75.9%.

Note that each track of the DVD-RAM is formed by a wobbled land and groove except for the header field of each physical sector. The number of wobbles per sync frame is 8. Since one ECC block consists of 16 recording frames, it is formed by 416 sync frames.

Since this embodiment uses the same values as those of the DVD-RAM for the sync frames, recording frames, and ECC block size, one sync frame consists of 93 bytes and 8 wobbles, one recording frame consists of 26 sync frames, and one ECC blocks consists of 416 sync frames. As has been explained above, the index header 12 has a 2-sync frame length.

The recording field 15 is made up of a header field 19 and data field 20, and consists of a total of 420 sync frames, as shown in FIG. 9. Of these sync frames, a data portion for one ECC block consists of 416 sync frames. If the front and rear parts of this data portion are respectively called a front and rear, one recording field is made up of a data portion, and the front and rear each consisting of 2 sync frames.

FIG. 11A shows handling of sub recording fields when the recording field crosses an index header 12. If a field before the index header is called a sub recording field a 16, and a field after the index header is called a sub recording field b 17, each sub recording field consists of a header field 19 and a sub data field 43 (45). Since the sub recording field is made up of a front 40 and rear 42 each consisting of 2 sync frames except for a data portion as in the recording field 15, data a 44 of the sub recording field a 16 consists of M sync frames ($1 \leq M \leq 415$). Hence, data b 46 of the sub recording field b 16 consists of (416–M) sync frames.

The present invention will be explained using practical numerical values. Assume that the wavelength of a violet laser is 405 nm, the NA of an objective lens is 0.66, the diameter of the optical disk is 120 mm, and the recording area ranges from 24.1 mm to 57.89 mm as in the DVD-RAM. Data recording uses a ZCLV recording scheme as in the DVD-RAM. As for the number of zones, since physical sectors need not be aligned unlike the DVD-RAM, zones can be freely set. In this embodiment, the number of zones of each recording layer is set to be 100 so as to suppress recording clock differences among zones to about 1% even when continuous write is made from the inner to the outer periphery. Note that lead-in and lead-out areas respectively formed on the inner and outer sides of the disk are omitted.

FIG. 16 shows an embodiment of a track layout in each zone. If the track pitch is set at 0.348 $\mu$m in consideration of cross erase with neighboring tracks, the total number of tracks is 97,000, and the number of tracks per zone is 970. On the other hand, the bit length is 0.159 $\mu$m in consideration of OTF and the like. Also, if the spacing between the recording layers is 25 $\mu$m in consideration of aberrations and the like, the diameter of the defocus spot 223 formed on the first recording layer 214 when the second recording layer 215 is in focus is around 8 $\mu$m. If a maximum deviation amount of the overlap between index headers is ±50 $\mu$m in the tangential direction, the width of a dummy area 201 on one side of the index header formed on the first recording layer 214 is 54 $\mu$m if it is smallest, and 108 $\mu$m for a total width of two areas. The width of a dummy area 201 provided at a similar position on the second recording layer 215 is 108 $\mu$m if it is smallest, and 216 $\mu$m for a total width of two areas.

Since one sync frame length is around 118 μm, each dummy area 201 of the first recording layer 214 has a 1-sync frame length, and that of the second recording layer 215 has a 2-sync frame length for the sake of simplicity. Note that the width of the dummy area 201 need not always be an integer multiple of the sync frame length.

Each track in zone 0 including the innermost track is 119,319 bytes per round, and has 1,283 sync frames. Of the 1,283 sync frames, two sync frames are assigned to the index header. Furthermore, one sync frame is assigned to a dummy area 201 on the first recording layer 214, and two sync frames on the second recording layer 215. For example, recording fields are recorded on the remaining 1,280 sync frames.

FIG. 17 shows the relationship between the tracks in zone 0 and recording fields. When three recording fields 15 each consisting of 420 sync frames are written in track 0, the number of remaining frames of that track is 20. That is, a sub recording field for 20 sync frames is generated. In the sub recording field for 20 sync frames, four frames are assigned to a front and rear, and 16 sync frames are assigned to a data portion. In next track 1, a sub recording field for 404 sync frames is generated. In the sub recording field for 404 sync frames, four frames are assigned to a front and rear, and 400 sync frames are assigned to a data portion. That is, the sub recording field for 20 sync frames and the sub recording field for 404 sync frames respectively correspond to the sub recording fields a and b shown in FIG. 11A.

When two recording fields each consisting of 420 sync frames are recorded after the sub recording field for 404 sync frames, 36 sync frames remain. That is, a sub recording field for 36 sync frames is generated. In the sub recording field for 36 sync frames, four frames are assigned to a front and rear, and 32 sync frames are assigned to a data portion. In next track 2, a sub recording field for 388 sync frames is generated. In the sub recording field for 388 sync frames, four frames are assigned to a front and rear, and 384 sync frames are assigned to a data portion.

When this process is repeated, the layout of all recording fields and sub recording fields in zone 0 is determined. When this process is repeated until zone 99, the layout of recording fields and sub recording fields on the entire disk is uniquely determined. The format efficiency is around 83.6% for the first recording layer 214, and 83.5% for the second recording layer 215. This value is about 1% lower than 84.7% of the DVD-ROM and is greatly improved compared to 75.9% of the DVD-RAM. Note that dummy areas 201 on two sides of each index header on the first recording layer 214 occupy only 0.1% of the entire first recording layer 214, and dummy areas 201 on two sides of each index header on the second recording layer 215 occupy only 0.2% of the entire second recording layer 215.

Data to be allocated in each dummy area 201 will be explained below. Since each dummy area 201 of the first recording layer 214 must have a transmittance equal to the index, it is preferably formed as an embossed pit area as in the index header. Data to be formed by embossed pits may be data indicating all "0"s, the same data as VFO, or random data.

Each dummy area 201 of the second recording layer 215 must be a user information recording inhibition area. This area includes a portion where the reproduction light intensity changes transiently. Hence, this area may record all "0" data, the same data as VFO, or random data formed by embossed pits. In addition, this portion may be used as a buffer area for the groove or land track, as shown in FIG. 6.

In addition, data having a known mark length or mark spacing may be recorded. When this data is used to adaptively equalize a waveform or as a training pattern of a crosstalk canceller, waveform equalization precision upon reproducing the optical disk can be improved. An adaptive equalizer that attains adaptive equalization uses a transversal filter. At this time, the tap gain of the transversal filter is calibrated in turn by an adaptive algorithm to accurately obtain an equalized waveform as a target signal waveform, and is adaptively adjusted to a desired value to finally obtain zero equalization error. At this time, since the training pattern is known, the tap gain can be accurately and efficiently controlled to converge by comparing this pattern with a reproduction signal pattern after adaptive equalization. Likewise, the crosstalk canceller uses, e.g., a transversal filter as a waveform equalizer. By comparing a reproduced waveform after equalization upon reproducing the training pattern, and an ideal reproduced waveform obtained from the training pattern, the tap gain of the transversal filter can be accurately and efficiently controlled to converge. For example, the training pattern at that time uses a known random pattern containing 3T, 4T, and 5T or more marks and mark spacings, and staircased pattern in which the mark length and spacing increase in turn like 3T, 4T, 5T, 6T, . . . , 14T.

Since data having a known mark length and mark spacing is recorded, the signal crosstalk amounts from the right and left tracks can be detected. Hence, the tilt amount of the disk can be measured based on this result. At this time, for measurement, the aforementioned random pattern or staircased pattern may be recorded, or when signals having different frequencies are recorded in units of tracks, the ratio between the signal amplitude of a track to be scanned and the crosstalk amount of the right and left tracks can be measured from the spectrum of a reproduction signal.

Figure 18:
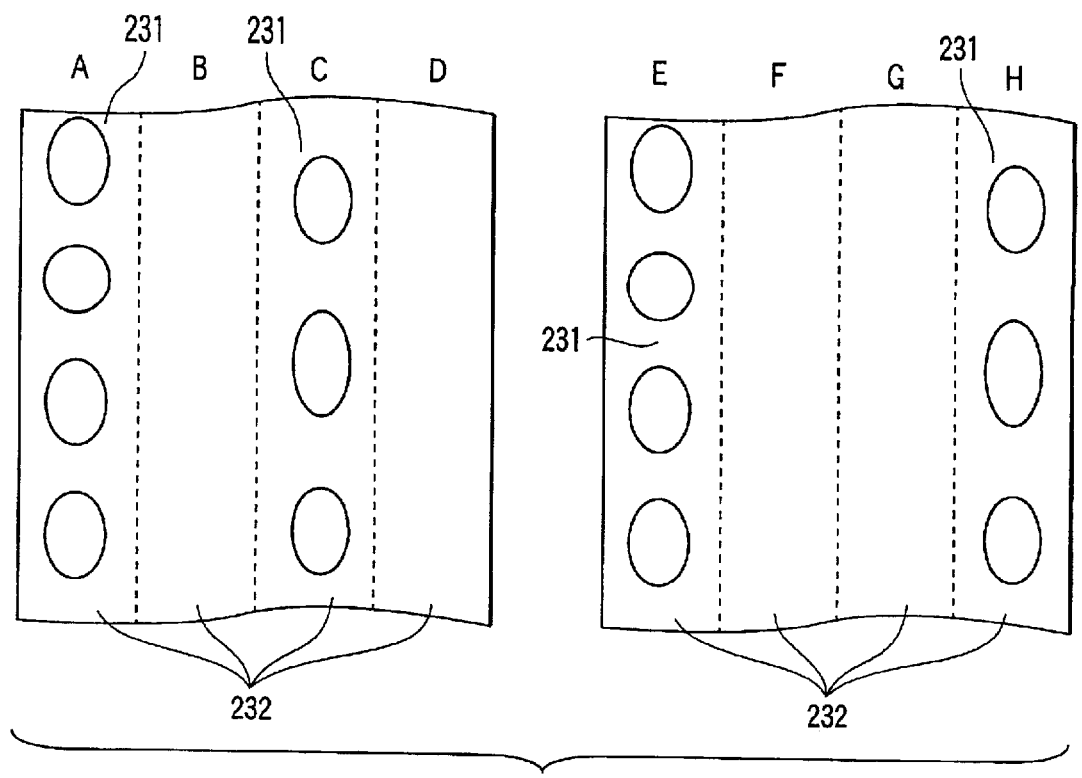
FIG. 18 shows an example of a layout method of a training pattern located in a dummy area.
Figure 19:
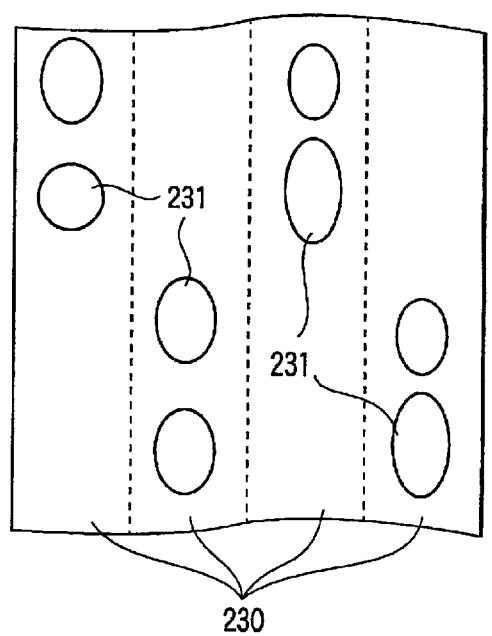
FIG. 19 shows an example of a layout method of a training pattern located in an adjustment area.

Furthermore, areas for recording data having a known mark length and mark spacing are assured every other tracks. When this track is reproduced, since the influence of crosstalk from neighboring tracks can be removed, the aforementioned adaptive equalization can be accurately done. When a track without data, which neighbors the track on which that data is recorded is reproduced, a crosstalk amount from neighboring track can be detected. Also, the tilt amount of the disk can be obtained from the ratio between the right and left crosstalk amounts. Furthermore, areas for recording data having a known mark length and mark spacing are assured every third tracks, and when a track without data is reproduced, a crosstalk amount from one neighboring track can be measured. FIGS. 18 and 19 show an embodiment of the layout of data having a known mark and mark spacing. In the layout shown in FIG. 18, for example, when track B is reproduced, signal crosstalk amount from data recorded on tracks A and C can be measured. On track C, a signal can be reproduced without being influenced by crosstalk. When track F is reproduced, the signal crosstalk amount from data recorded on track E can be measured.

When data are alternately recorded, as shown in FIG. 19, the measurements described in FIG. 18 can be made without changing tracks to be reproduced.

The format efficiency of the recording field 15 never drops due to recording of data for a training pattern 231.

Figure 20:
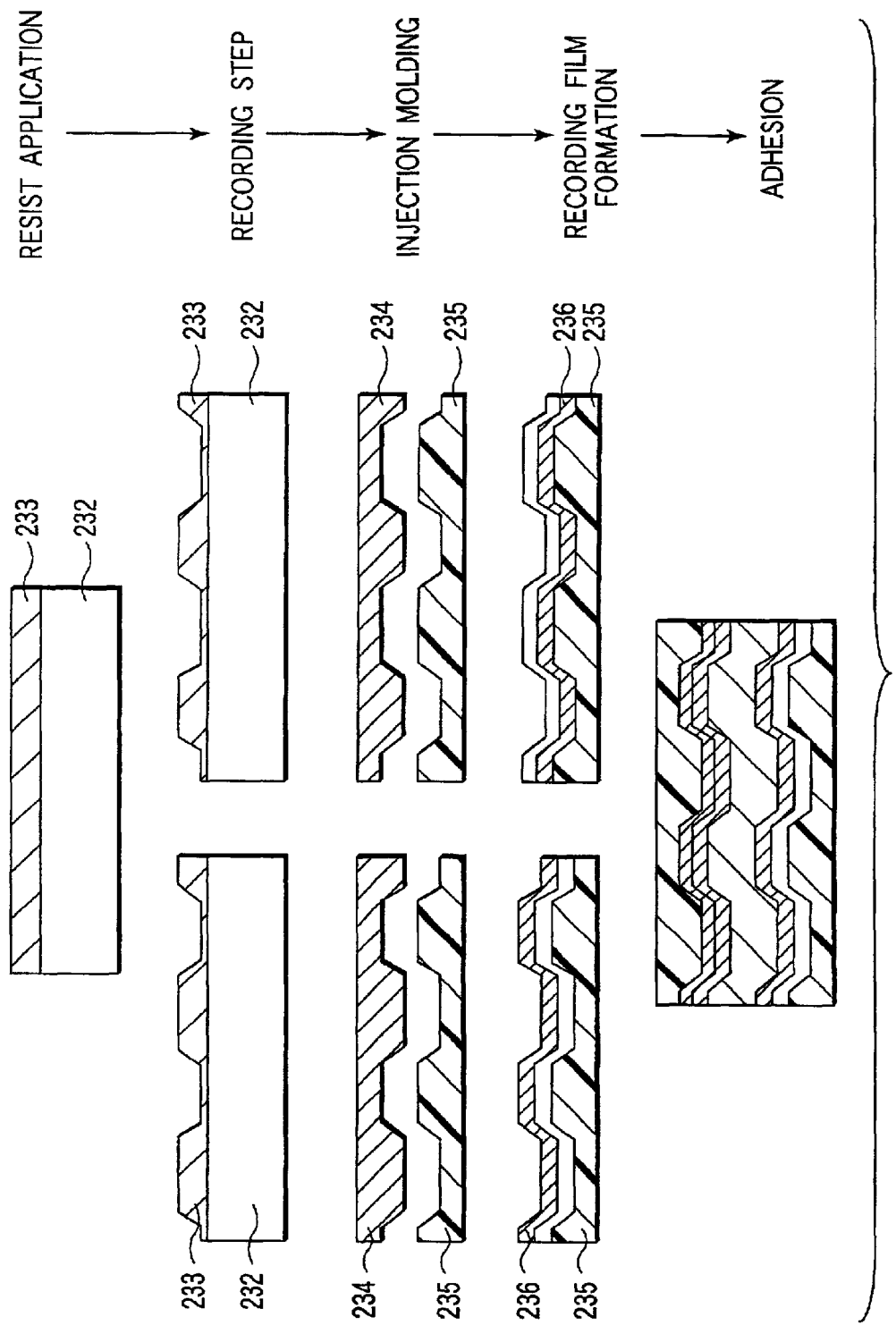
FIG. 20 shows an example of a method of manufacturing an optical disk according to the present invention.

An example of the manufacturing method of the optical disk 10 will be explained below. As shown in FIG. 20, substrates 211 of the respective recording layers of the optical disk are independently formed. A resist film 233 is applied to a master disk 234 and undergoes recording, thus forming a resist film 233 formed with tracks and embossed pits. A stamper mold 235 is prepared from this master disk 234. A resin is molded using this stamper mold 235 to prepare a resin-molded substrate 236. A recording layer 237 made up of a plurality of films is formed on the resin-molded substrate 236 using a sputtering apparatus or the like. Finally, two substrates 211 are adhered face to face to sandwich an intermediate layer 212 therebetween, thus completing the disk. When a read-only disk is manufactured, a resin-molded substrate 236 formed with embossed pits is molded. On this resin-molded substrate 236, a reflection film is formed as a back layer, and a semi-transparent film is formed as a front layer. Two recording layers 237 are adhered face to face to sandwich an intermediate layer 212 therebetween, thus completing the disk.

In this adhering step, the two layers must be adhered so that index headers 12 of the two layers overlap each other to have appropriate precision along the radial and tangential directions of the disk. Since each index header 12 has optical characteristics different from other regions, the recording layers can be stacked using such headers as marks so that index headers overlap each other. At this time, for the disk shown in FIG. 4, the two recording layers can be adhered so that the embossed pit area of the first recording layer completely falls within the second recording layer. For the disk shown in FIG. 6, the two recording layers are adhered so that the embossed pit area of the first recording layer 214 completely falls within the second recording layer 215. In addition, each layer of the optical disk may have marks 238 for adhesion on the innermost or outermost area of the optical disk, which is not used to record/reproduce normal information. The marks 238 may be dots having the same size on the two layers, or dots on one layer may be larger than those on the other layer by an allowable overlap error. As shown in FIG. 22, in the former case, the two layers are adhered while observing the marks 238 of the respective layers so that they completely overlap each other. In the latter case, the two layers are adhered so that smaller marks 238 completely fall within larger marks 238. In this case, the widths of dummy areas 201 required on two sides of each index header change depending on the overlap precision of index headers in the circumferential direction. The overlap deviation in the radial direction has a small influence since the index headers are aligned on the entire disk in the radial direction. The widths of the dummy areas 201 around the lead-in area and lead-out area 204 must be determined taking a radial deviation into consideration.

An optical disk apparatus for recording and reproducing data by driving the aforementioned optical disk 10 will be explained below using FIG. 23.

The optical disk 10 is mounted on a spindle motor 100 via a clamp hole 11 and clamper 101. The spindle motor 100 is driven by a motor driver 180. An optical head 110 opposes the rotating optical disk 10, and recording/reproduction on the optical disk 10 is achieved by a light beam emitted by the optical head 110.

The optical head 110 comprises an objective lens 111, a lens actuator 115 for moving this objective lens 111 in the focus and radial directions of the disk, an optical system 113 for recording and reproduction, a violet semiconductor laser LD, a multi-split photodetector 114 for extracting a reproduction signal from light reflected by the disk, and the like. The entire optical head 110 is moved in the radial direction of the disk 10 by a radial feed actuator 115.

Light emitted by the semiconductor laser LD passes through the optical system 113 and is arbitrarily focused on each recording layer of the optical disk 10 by the objective lens 111. Light reflected by the disk enters the multi-split photodetector 114 via the objective lens 111 and head optical system 113 in an order opposite to the aforementioned order. The multi-split photodetector 114 includes a two-split push-pull detector for detecting a tracking error signal, and the groove and land tracks 13 and 14 are tracked using a signal detected by the two-split push-pull detector. Servo information from the detector is processed by a reproduction amplifier 120 and signal processor 130, and a controller 150 generates a control signal, which is supplied to an ACT driver 170.

An RF reproduction signal is received by a read detector. The RF reproduction signal is amplified by the reproduction amplifier 120, and is then sent to the signal processor 130. A wobble signal is superposed on this RF reproduction signal, and can be easily separated using a low-pass filter. A reproduction signal of data can be separated using a high-pass filter that does not pass the wobble signal.

The detected wobble signal is 8 cycles per sync frame, and wobbles are formed in innermost track 0 except for the index header and dummy areas 201. The rotational speed of the spindle motor 100 is controlled by a rotation control signal obtained by frequency-dividing this wobble signal. For this reason, since rotation of the spindle motor 100 is synchronized with the wobble signal of the disk, a small buffer need only be prepared upon data recording. The rotation control signal is generated by the controller 150.

On the other hand, a clock signal used in recording uses the wobble signal multiplied by a constant. That is, the frequency of a recording clock signal is determined based on that of the wobble signal. Since 8–16 modulation uses 186 channel bits per wobble, the recording clock signal is multiplied by 186. By generating the recording clock signal based on the wobble signal, the buffer length in the data field 20 can be shortened. This recording clock signal is generated by the controller 150.

Figure 24:
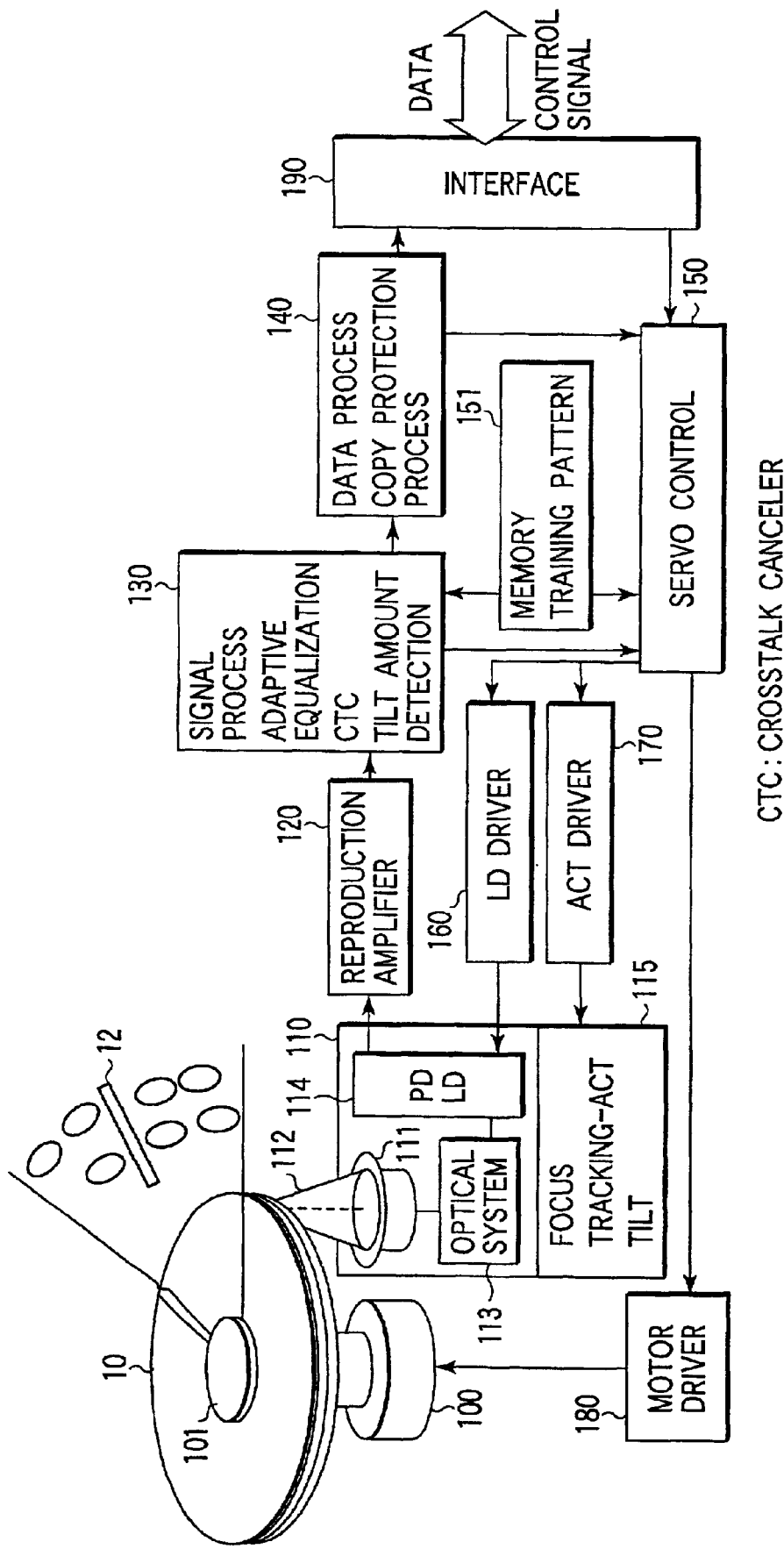
FIG. 24 is a schematic block diagram of an optical disk driving apparatus according to an embodiment of an information reproduction apparatus of the present invention.

FIG. 24 shows the arrangement of a reproduction apparatus. This arrangement is obtained by excluding a control device for recording, formatter, and components for test recording from the recording/reproduction apparatus shown in FIG. 17. This apparatus can reproduce not only a read-only disk but also a rewritable disk after recording fields are recorded.

Figure 25:
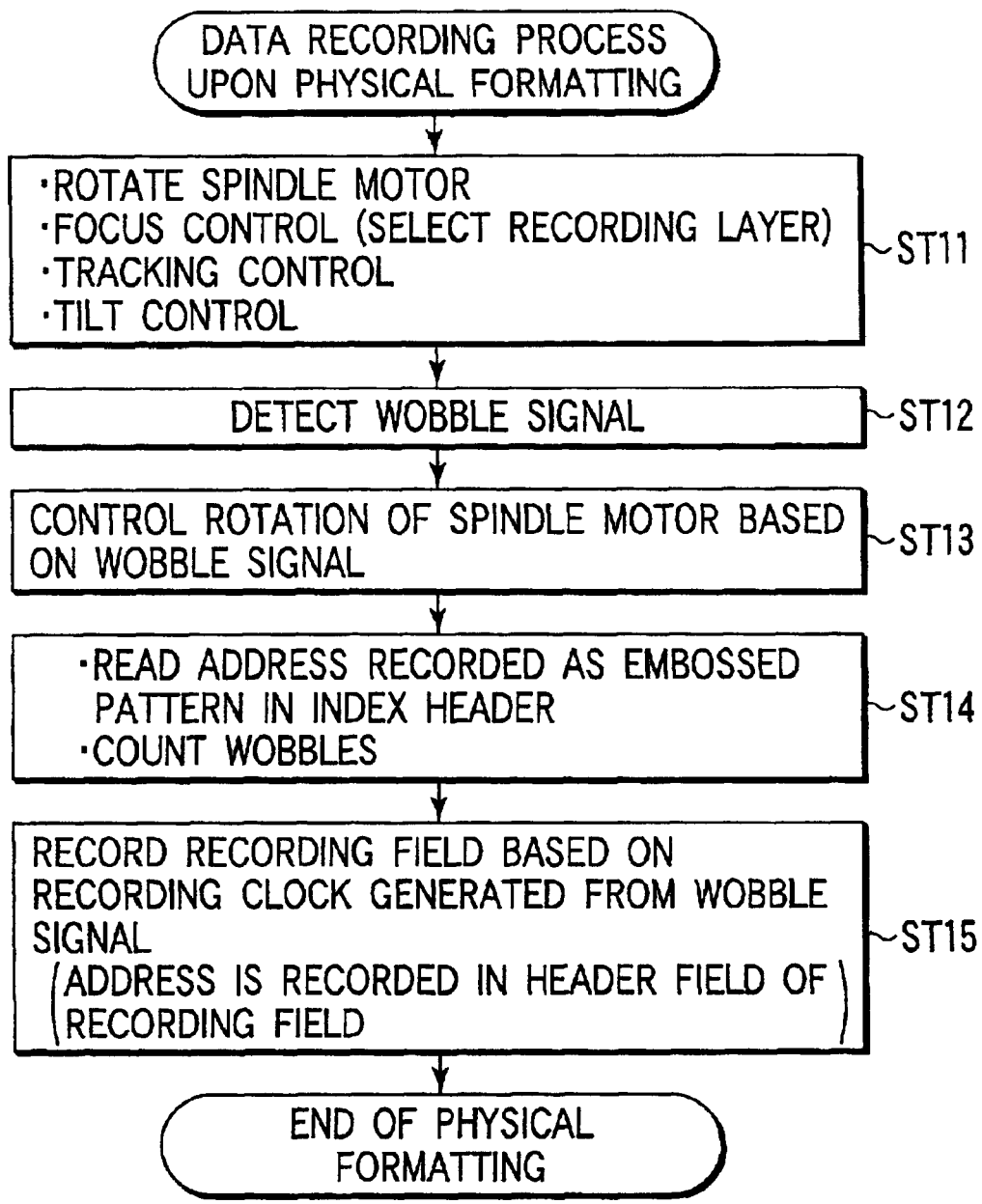
FIG. 25 is a flow chart showing a data recording process (recording of recording fields) executed upon physically formatting the optical disk shown in FIG. 1A.

Physical formatting mainly for computer use will be explained below using the flow chart shown in FIG. 25. As has been explained above, 97,000 tracks are divisionally set in 100 zones, and each track in each zone consists of a plurality of recording fields (including sub recording fields). The physical address of an arbitrary recording field is determined by a track address recorded as an embossed pattern in the index header and the number of wobbles starting from the index header.

The optical disk 10 is set in the optical disk apparatus, and the spindle motor 100 is rotated (ST11). Subsequently, focus control is executed (ST11). When the disk is formatted for the first time, the first recording layer 214 is accessed first. The optical head 110 is moved to the lead-in area located at the inner peripheral side while executing tracking control (ST11). Furthermore, the signal processor 130 detects a tilt amount, and controls tilt ACT based on the detection result. At this time, the controller 150 serves as a tilt controller. A wobble signal is detected in this state (ST12), and rotation of the motor is controlled on the basis of the wobble signal (ST13).

As it is the first recording since disk insertion, the recording strategy is optimized before physical formatting.

When the spot falls within a test recording area, the controller 150 generates test data based on information of a test pattern recorded in a memory 151, and records the test pattern. The signal processor 130 then executes a statistical comparison/discrimination process of a reproduction signal of the recorded test pattern and the test pattern stored in the memory 151, thus determining an optimal recording strategy. The result is stored in the controller 150, and is used in recording control later. When a physical formatting command is issued to the optical disk apparatus via an interface 190, the address recorded as an embossed pattern in each index header is read (ST14) to search for track 0 of the first recording layer 214. On the other hand, a formatter generates data to be recorded in the header and data fields 19 and 20 as preparation for write in the recording fields. Upon detection of an index header 12 formed by an emboss signal in track 0, recording in recording field 15 immediately starts. The recording clock uses a clock obtained by multiplying the wobble signal by a constant, and a signal read out from the formatter is input to an LD driver 160, thus starting recording on the optical disk 10 (ST15). The address of the recording field 15 is incremented, and recording fields are recorded in turn. After the last recording field 15 of the outermost track on the recording area is recorded, a write of a format signal on the first recording layer 214 is complete.

The second recording layer 215 is then accessed. At this time, on the disk shown in FIGS. 2 and 4, since the layout of dummy areas 201 on the second recording layer 215 is determined in advance, a format signal is written in the same manner as in the first recording layer 214, thus completing formatting of the disk.

However, on the optical disk shown in FIG. 6, the positions of dummy areas 201 on the first recording layer 215 must be determined, since they are not determined in advance. In this case, the dummy areas 201 on the second recording layer 215 are determined by the ranges of changes in reflectance and transmittance caused by embossed pits of the index headers 12 and dummy areas 201 of the first recording layer 214. In order to determine the ranges of the dummy areas 201 on the second recording layer 215, the second recording layer 215 is reproduced for one round of a track. Since this reproduction signal has an offset in the embossed pit area of the first recording layer 214, as shown in the lower graph in FIG. 6, a reference level is determined in advance, and an area in which a change beyond that level has occurred is determined to be the range of each dummy area 201 of the second recording layer 215. More specifically, a range starting from the end of the index header 12 of the second recording layer 215 to a position where the first recording signal can be synchronized from an instance when the reproduction signal returns from a state in which the reference level has been exceeded to a normal state (a portion of the first recording layer 214 is different from embossed pits) is determined to be a dummy area 201. From this position, recording of a recording field 15 starts, and sync frames are set. Sync frames are set in turn for each round of the track up to a position where a sync frame can be set without omission to define a recording area, and the range from that position to the index header 12 is defined to be a dummy area 201. Note that synchronization of a recording signal is determined by the phase of wobbles 18. The range information of each dummy area 201 determined by the above sequence (more specifically, the information of the number of wobbles or time duration from each index header) is recorded in a memory of the information recording/reproduction apparatus or at a predetermined position in the lead-in area of the disk. After the ranges of the dummy areas 201 are determined, since the layout of recording fields 15 on the entire second recording layer 215 can be determined, a format signal is written as in the first recording layer 214, thus completing formatting of the disk. Note that the ranges of dummy areas 201 may be determined for all tracks or may be determined once per zone or at a few location on the disk. Data recorded in the data field of each recording field 15 upon formatting is used to inspect the optical disk for defects, and the same data is recorded in all the recording fields 15. In this case, since the signal is recorded on the entire recording area of the first recording layer 214, and the entire area has a uniform transmittance and reflectance, recording can be stably done on the second recording layer 215.

After physical formatting, it is checked if data recorded in the header and data fields of the recording fields 15 can be normally reproduced. That is, a so-called defect management process is executed. If data recorded in the header field of a given recording field 15 cannot be normally read, or when the number of errors contained in data read from the data field is larger than a predetermined reference value, that recording field 15 is replaced by a spare recording field 15 prepared for the defect process. At this time, before desired data on the disk is reproduced, the training pattern 231 recorded in the adjustment area is reproduced to determine the optimal tap gains of the adaptive equalizer and crosstalk canceller by the signal processor 130. Furthermore, when the beam spot crosses the training pattern 231 during the defect management process, the optimal tap gain is re-set in some cases.

In this way, when the entire recording layer is physically formatted and undergoes defect management before the user records data like in normal optical disks, all physical addresses of this optical disk are determined. Furthermore, the entire information recording area of the first recording layer 214 can always have a uniform transmittance. For this reason, when the user records actual data, the optical disk apparatus can detect the address recorded in the header field of each recording field 15. Address data obtained from the index header and wobble signal is used as reference address data.

Figure 26:
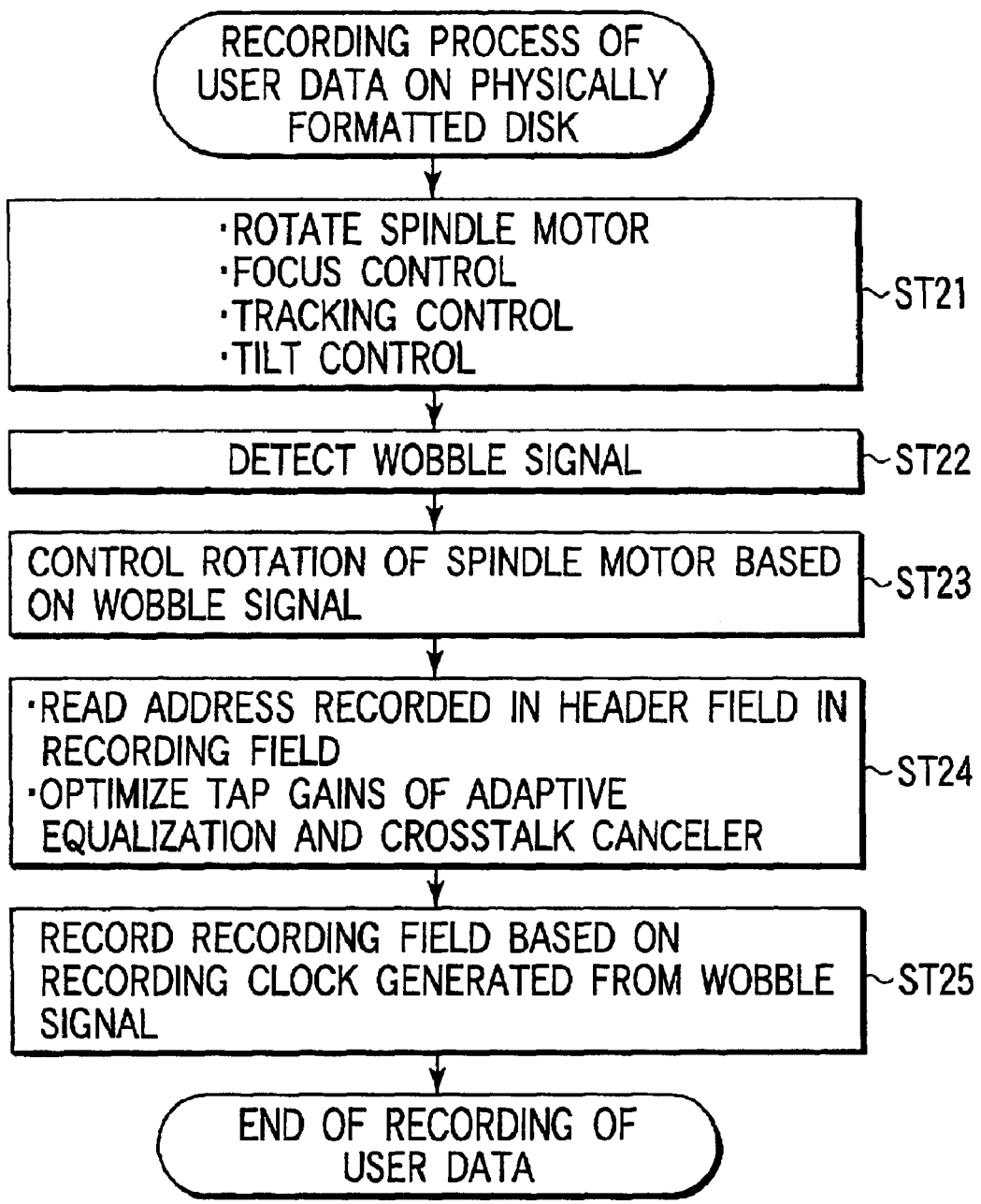
FIG. 26 is a flow chart showing a recording process for recording user data on the physically formatted optical disk.

Recording of user data on the disk that has undergone physical formatting, as described above, will be explained below with reference to the flow chart shown in FIG. 26.

The optical disk 10 is set in the optical disk apparatus, and the spindle motor 100 is rotated (ST21). Subsequently, focus control of an arbitrary recording layer is executed (ST21). The optical head 110 is moved to the lead-in area located at the inner peripheral side while executing tracking control (ST21). Furthermore, the signal processor 130 detects a tilt amount, and controls tilt ACT based on the detection result. In this state, a wobble signal is detected (ST22), and rotation of the motor is controlled based on the wobble signal (ST23). The address recorded in the header field of each recording field 15 is read (ST24) to access an area where the training pattern 231 is recorded. The training pattern 231 is reproduced to optimize the tap gains of the adaptive equalizer and crosstalk canceller (ST24). When a user data recording command is issued to the optical disk apparatus via the interface 190, a target recording field is accessed. User data is recorded on the basis of recording clocks generated by the controller 150 from a wobble signal (ST25). When the training pattern 231 is passed during recording, re-determination of the tap gains of the adaptive equalizer and crosstalk canceller and detection the tilt amount are sequentially done in some cases.

More specifically, upon recording data in the recording fields after physical formatting, the address of the recording field 15 as a destination and a sequence of data information to be recorded in the data field are determined based on recording data received via the interface 190. Then, a recording field 15 that matches the determined address is searched for, and when a target recording field is found, data is written in the data field of that target recording field. When the target recording field 15 crosses an index header, data is written while breaking up the recording field into sub recording fields. Formatting information of the recording fields 15 is saved in the formatter, and the physical state on the disk can be determined by designating a logical address. All these processes are controlled by the controller 150.

The process for formatting the entire surface of the optical disk and checking the entire surface for defects requires a very long time. When the disk manufacturer executes such process, the manufacturing cost of the disk increases consequently, or when the user does it, too much time is required until the disk is ready to be used. Depending on the use purpose of the disk, defect checking over the entire recording layer is not always required. Even in such case, according to the present invention, data can be randomly written at an arbitrary position, and continuous data such as video data can be seamlessly recorded.

Assume that only an area of the disk where file directories are recorded is formatted, and the remaining area where no data is written remains unformatted. Data is recorded on the unformatted area. The controller (formatter) 150 has an address space determined by the index headers and the number of wobbles. When data is written in the formatted area, data is recorded in only the data field of each recording field 15. On the other hand, when recording is done on an unformatted recording field, header and data fields are recorded together.

When the disk is not physically formatted, both header and data fields of each recording field 15 are recorded using the address space of the controller 150 (formatter). Of course, data received by the interface is recorded in a data portion of the data field.

At this time, when information is recorded on the second recording layer 215 after information is recorded on the entire information recording area of the first recording layer 214, since the information recording area of the first recording layer 214 has a uniform transmittance and reflectance, recording can be stably done on the second recording layer.

Figure 27:
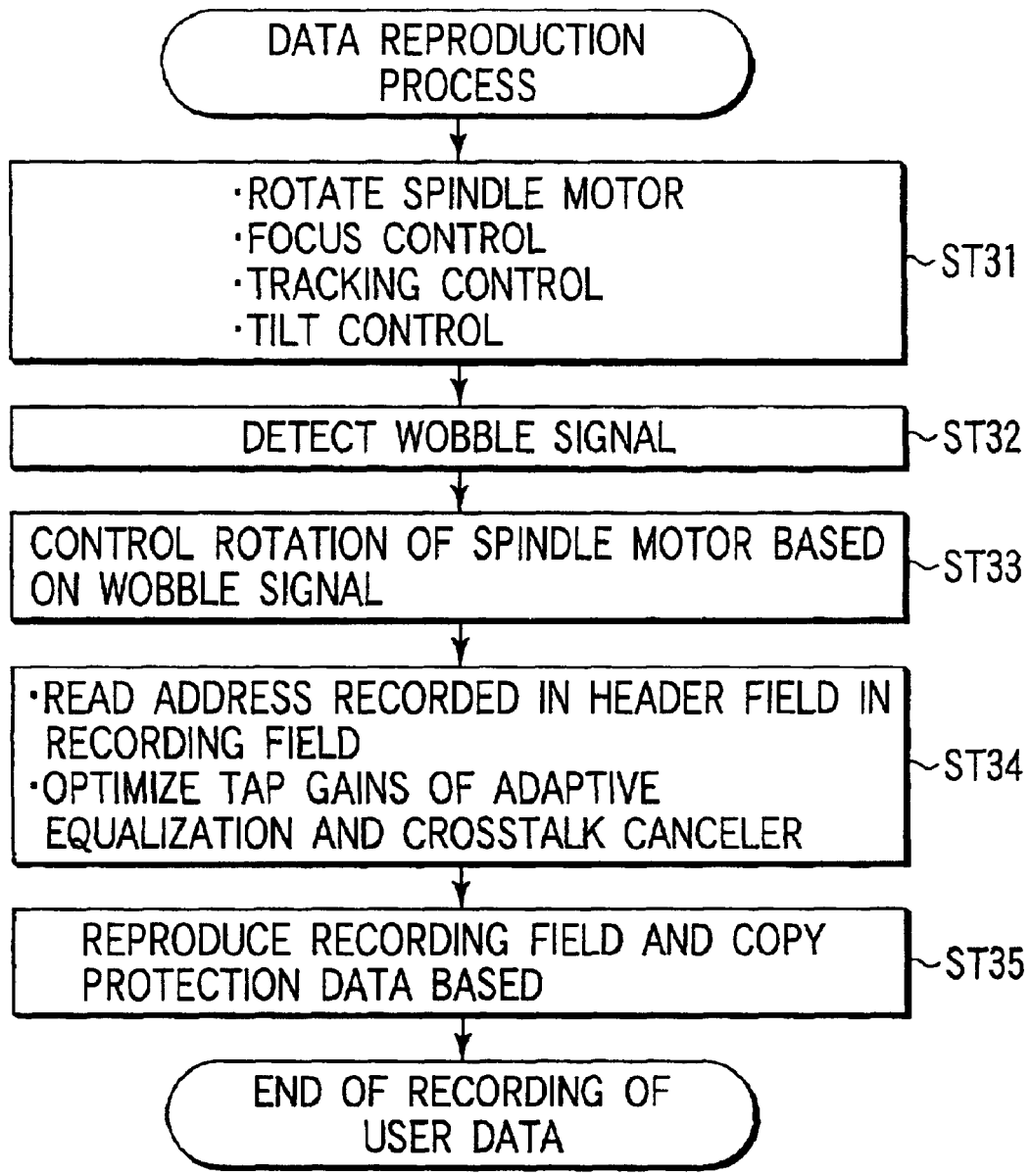
FIG. 27 is a flow chart showing a reproduction process for reproducing user data from the optical disk on which the user data have been recorded.

The reproduction process of data recorded on the optical disk 10 will be described below with reference to the flow chart shown in FIG. 27.

The optical disk 10 is set in the optical disk apparatus, and the spindle motor 100 is rotated (ST31). Subsequently, focus control is executed (ST31). The optical head 110 is moved to the lead-in area located at the inner peripheral side while executing tracking control (ST31). Furthermore, tilt ACT is controlled. In this state, a wobble signal is detected (ST32), and rotation of the motor is controlled based on the wobble signal (ST33). When a user data reproduction command is issued to the optical disk apparatus via an interface 190, the address recorded in the header field of the recording field 15 is read (ST34) to access a target recording field 15. At this time, when the beam spot crosses the training pattern 231, the tap gains of the adaptive equalizer and crosstalk canceller are optimized (ST34). User data recorded in the data field of the target recording field 15 is reproduced on the basis of reproduction clocks generated by the controller 150 based on the wobble signal (ST35). More specifically, the optical head 110, the reproduction amplifier 120, the signal processor 130, a data processor 140, and the like which serve as a reproduction means reproduce data recorded on the optical disk 10.

In the first embodiment, land & groove recording has been explained. Alternatively, the present invention can be similarly applied to groove recording.

In the first embodiment, a single spiral has been explained, but double spirals may be used.

In the present invention, a rewritable optical disk has been exemplified. However, the present invention can be similarly applied to a medium such as a write-once disk or the like on which data can be recorded only once.

Furthermore, in the present invention, ZCLV has been exemplified. Since the number of zones can be freely selected in the present invention, the number of zones can be set to be equal to the number of tracks. That is, the present invention can also be applied to CLV.

Furthermore, in the present invention, a rewritable optical disk has been exemplified. In order to assure compatibility with the rewritable optical disk, exactly or nearly the same format as the present invention can be applied to a ROM type optical disk formed by embossed pits.

In the first embodiment of the present invention, the ECC block (32 kbytes: 416 sync frames) used in the DVD is used as an example of the data recording unit. When the recording density increases, ECC must be further strengthened and, in general, the ECC block size increases. When the ECC block size becomes 64 kbytes, the size of the recording field 15 increases accordingly, and other fields become small relative to the data portion. Therefore, the format efficiency can be further improved.

In the first embodiment of the present invention, a total of four sync frames are used for the front and rear of the recording field, but the present invention is not limited to such specific structure.

In the first embodiment of the present invention, an index header is defined by two sync frames, and four headers are set in the index header. However, the present invention is not limited to such specific structure.

In the first embodiment of the present invention, two recording layers are used, but the present invention can be applied to a disk having three or more recording layers.

In the description of the first embodiment of the present invention, the transmittance and reflectance in the crystalline state are different from those in the amorphous state. Even when these states have equal transmittance and reflectance, since the embossed area and groove area have different influences of scattering and diffraction, the effect of the present invention is effective.

In the present invention, the optical disk has a plurality of recording layers, and information can be recorded on/reproduced from a target recording layer using a light beam coming from one surface side. On each recording layer, the physical address of each recording field 15 is determined by the index header 12 formed by embossed pits at one position per round, and wobbles. The index headers are aligned in the radial direction. The recording layers are adhered so that their index headers 12 overlap each other when viewed from the incoming direction of light. Dummy areas 201 are formed around the index headers 12 and the embossed pit area 202 of the lead-in area to adjust the transmittance and reflectance. Therefore, according to the present invention, even when the transmittance and reflectance of the recording layer change between the embossed pit area and other areas, information can be recorded/reproduced on/from each recording layer without any problems. Furthermore, each recording field can be randomly accessed by the address space determined by the index headers and wobbles or the address data in the recording fields. Since frequency switching (frequency jump) due to zone switching (zone cross) falls within a negligible range, even long, continuous information can be seamlessly recorded.

By recording data having a known mark length and mark spacing in the dummy areas 201, adaptive equalization, crosstalk cancellation, and time amount measurement with higher precision can be attained. As described above, according to the present invention, since adaptive equalization, crosstalk cancellation, and time amount measurement can be made, a disk that is capable of highly reliable recording and reproduction even when its recording density increases can be provided without any format efficiency drop. Also, an optical disk apparatus, optical disk recording method, and optical disk reproduction method for recording/reproducing data with respect to such optical disk can be provided.

The format efficiency of the disk of the present invention is around 83.5%, and is greatly improved compared to 75.9% of that of the DVD-RAM. Since the format efficiency of the read-only DVD-ROM is 84.7%, and the present invention can provide the aforementioned optical disk with only about 1% loss of the format efficiency compared to the DVD-ROM, its practical effect is very high.

The effects of the present invention will be summarized below.

In the information recording medium of the present invention, since index headers are aligned in the radial direction on the entire disk, and a neighbor area of the index header is not used as a recording field, high recording/reproduction stability of recording fields can be assured.

Since the rotational speed of the information recording medium and clock frequency upon recording are determined with reference to the wobble frequency of the spiral track, and synchronization of a reproduction signal can be taken based on a wobble signal, the buffer area which is assured in the recording field to absorb eccentricity and variations of rotation can be shortened compared to that in the conventional disk.

When data is recorded for the first time without physically formatting the disk, the address data of a physical track is read out from the index header recorded at one position per round. The physical position within one round is accurately determined by counting the number of wobbles from the index header. Hence, data can be randomly recorded at a desired position without physically formatting the disk.

Since the width of each zone on the disk can be determined irrespective of sectors, if the width of each zone is set to be smaller than that on the conventional disk or the disk is not broken up into zones, a clock frequency jump that occurs upon crossing zones can be negligibly small, and continuous information can be seamlessly recorded.

Since only one embossed pit area is present per round of the track, when the irradiation light is focused on the back recording layer via the front recording layer, an area where recording/reproduction of a signal on the back recording layer becomes unstable due to changes in transmittance and reflectance on the front layer can be reduced.

Furthermore, on the information recording medium of the present invention, since the index headers of the respective recording layers are recorded to overlap each other viewed from the plane of incidence of the irradiation light, when the irradiation light is focused on the back recording layer via the front recording layer, even when the transmittance and reflectance of the index header of the front recording layer have changed, that portion is not a write-once or rewritable area in most cases. Hence, stable information recording/reproduction is allowed on nearly the entire write-once or rewritable area. Since the index headers are aligned in the radial direction on the entire disk, they can easily be allowed to overlap each other.

Furthermore, the information recording medium of the present invention comprises the dummy areas, and the transmittance of each dummy area is equal to that of the index header or another embossed pit area on that recording layer. Therefore, while irradiation light is focused on the back recording layer via the front recording layer and the index header or another embossed pit area on the back layer is reproduced, a change in transmittance on the front layer can be maintained constant.

Furthermore, on the information recording medium of the present invention, since each dummy area servers as a write-once or rewrite inhibition area, no change in transmittance takes place due to write-once or rewrite. Therefore, even when the disk suffers eccentricity or the overlap of index headers on the respective recording layer deviates, stable information recording/reproduction is assured on the entire write-once/rewritable area.

Moreover, the information recording medium of the present invention comprises an embossed pit mark having a known sequence in each dummy area. When this embossed pit mark is used as a training pattern for waveform equalization, crosstalk canceller, or tilt amount detection, information recording/reproduction with higher precision can be realized without any format efficiency drop on the recording fields. Since the dummy areas are entirely distributed in the radial direction of the disk, even when the tilt amount or waveform equalization condition differs depending on different radial positions on the disk, the tilt amount can be measured and the waveform equalization condition can be optimized at each radial position. Since each dummy area is located near the lead-in or lead-out area or immediately before or after the index header, and the physical position is determined even before the disk is physically formatted, information set in the dummy area can be easily found by search, and continuous recording is not disturbed.

In addition, since the information recording medium of the present invention has adhesion marks on those portions of the respective recording layers, which are not used in information recording/reproduction, the recording layers can be adhered to each other with reference to these marks so that the index headers overlap each other.

Therefore, according to the present invention, in an optical recording medium which has a plurality of stacked recording layers, and records/reproduces information with respect to a selected recording layer using incoming light from one surface, stable recording/reproduction can be done on the entire write-once or rewritable area on the disk, and either continuous data or random data can be efficiently recorded on the entire surface of the optical disk. Also, a training pattern can be entirely recorded in the radial direction of the disk without any format efficiency drop of the recording fields.

Furthermore, since high format efficiency is guaranteed and a small or zero clock frequency jump across zones is assured, if read-only data is recorded in place of the write-once or rewritable area, the format of the present invention can be applied to a read-only disk.

The second embodiment of the present invention will be described below with reference to the accompanying drawings.

Figure 28:
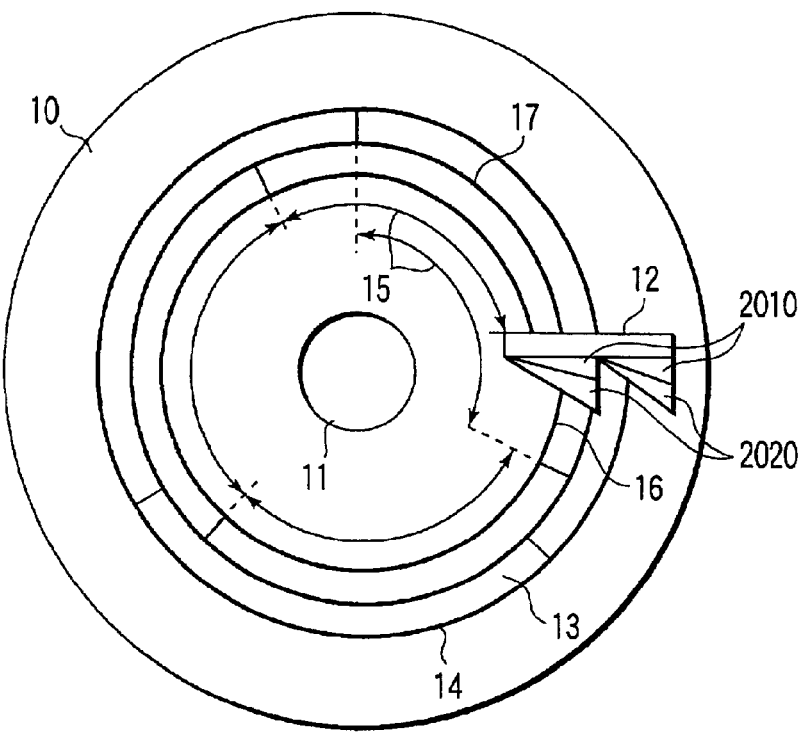
FIG. 28 shows an optical disk according to an embodiment of an information recording medium of the present invention and, more particularly, shows a spiral track, index header, and adjustment areas formed on the optical disk.
Figure 29:
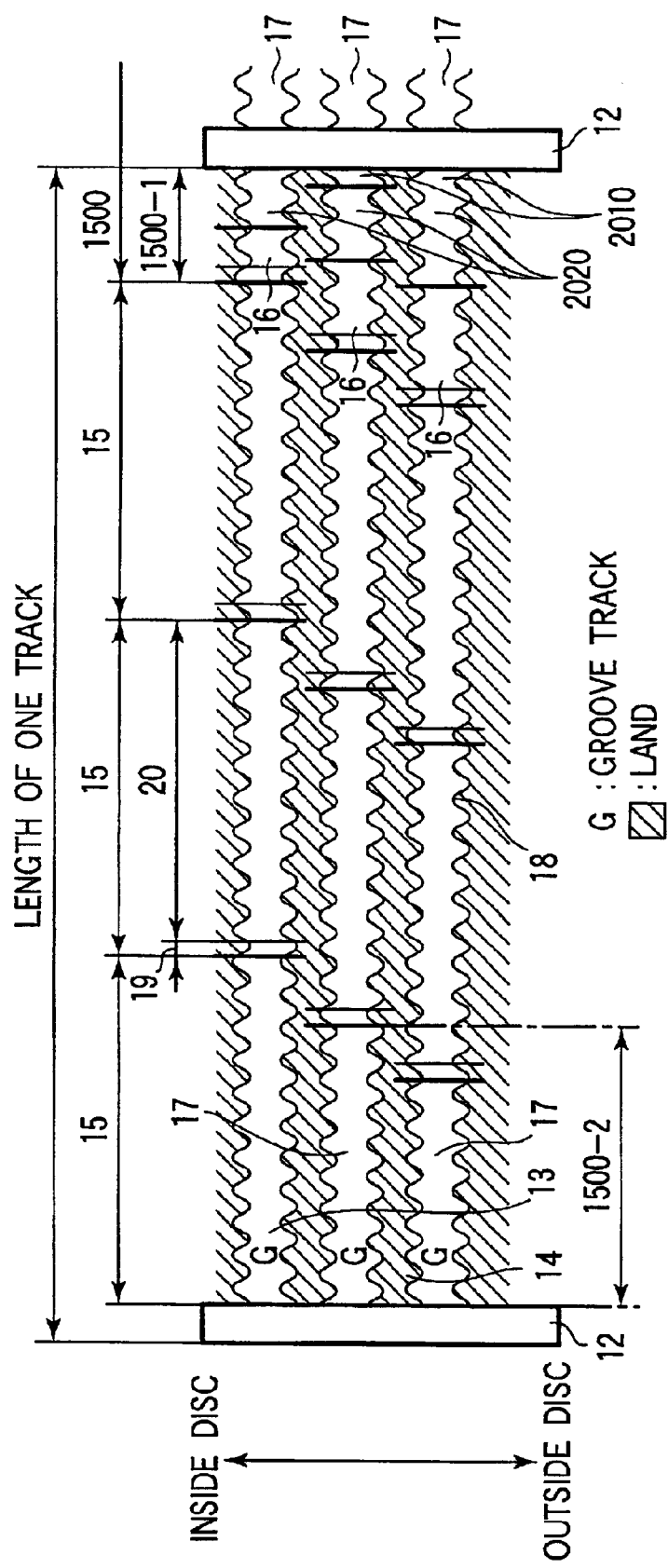
FIG. 29 is an enlarged view of the spiral track, index header, and adjustment areas formed on the optical disk shown in FIG. 28, and shows recording fields, sub-recording fields and the like recorded on the spiral track.
Figure 30:
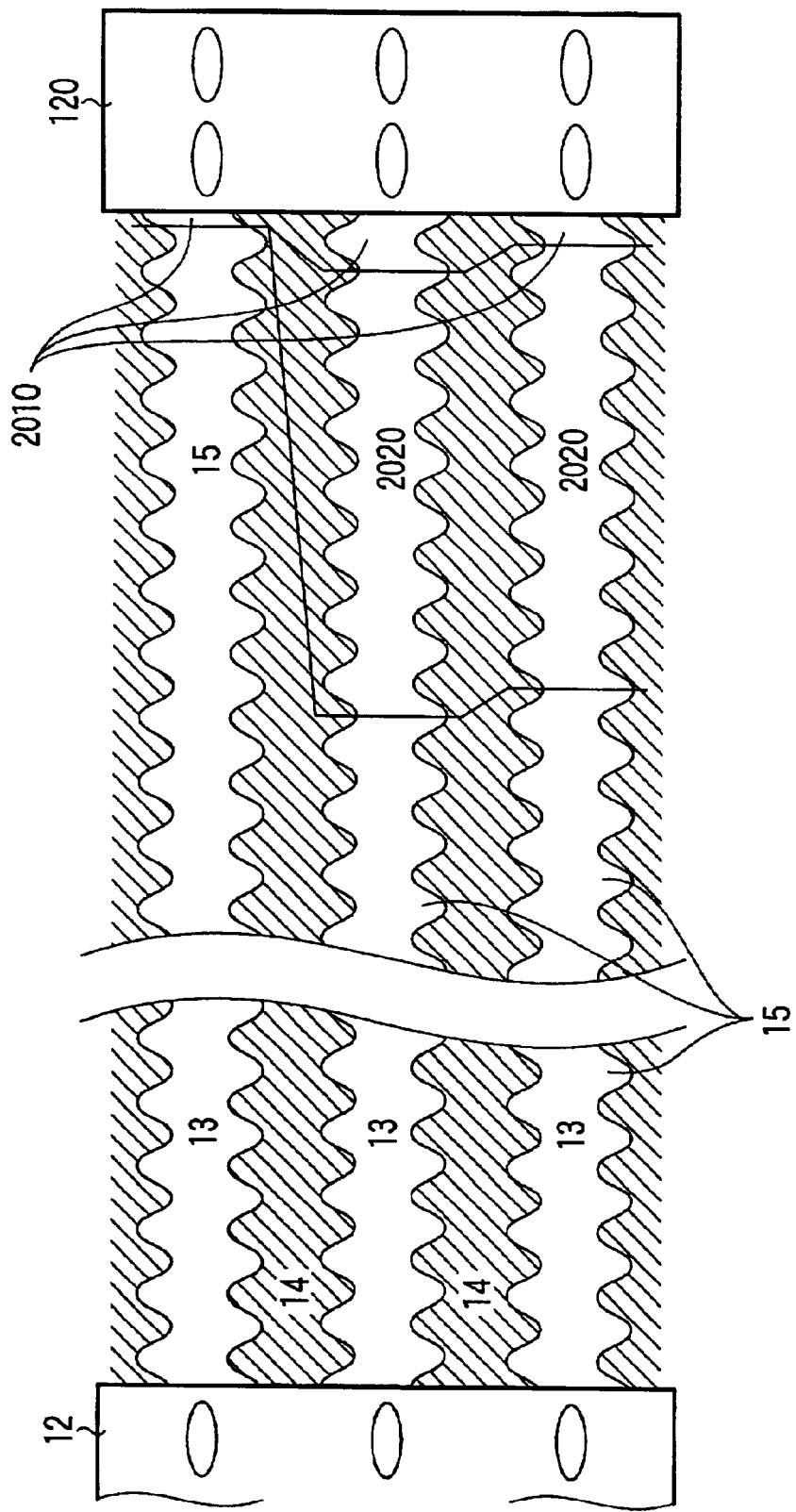
FIG. 30 is an enlarged view of the spiral track, index header, and adjustment areas formed on the optical disk shown in FIG. 28 near the index header, and shows a layout of adjustment areas.

A recordable optical disk according to an embodiment of the present invention will be described first. FIG. 28 shows the entire optical disk, FIG. 29 shows the track configuration of the optical disk, and FIG. 30 shows an embodiment of the layout of adjustment areas.

As shown in FIG. 28, an optical disk 10 comprises a spiral track (recording track) made up of groove-shaped groove tracks 13. Furthermore, the optical disk 10 comprises index headers 12 which are aligned in the radial direction of the disk to intercept the spiral track, and comprises adjustment areas a 2010 for wobbles on one or both sides of these index headers 12, and adjustment areas b 2020 which are located outside the adjustment areas a 2010 and are used to break up recording fields 15 in unit of sync frames. The trailing end position of the spiral track is adjusted by the adjustment areas.

The spiral track of the optical disk 10 has a groove shape, and the index headers 12 are aligned at one position per round of the track so that they appear once per round of the track upon scanning the light beam along the spiral track. The adjustment area is located in the neighborhood of the index header 12 along the track.

However, the present invention is not limited to such specific structure. For example, the index headers 12 may be aligned at two positions on the disk so that they appear twice per round of the track upon scanning the light beam along the spiral track (see FIG. 1B). Furthermore, the index headers 12 may be aligned at three or more positions on the disk (see FIG. 1C). FIGS. 1B and 1C show states wherein index headers 12 are located at a plurality of positions, and the adjustment areas a 2010 and b 2020 are not illustrated. However, in FIGS. 1B and 1C, the index headers 12 and adjustment areas a 2010 and b 2020 are located in practice as in FIG. 28. As the number of index headers 12 that appear per round increases, the reliability upon reading the addresses recorded in the index headers 12 can be improved. Also, when the number of index headers 12 increases, the format efficiency normally drops. Also, since the interval between neighboring index headers 12 can be shortened, a buffer area width and the like can be shortened accordingly. If each index header 12 consists of 1SF, format efficiency drop can be suppressed.

The adjustment areas may be located between all the index headers and recording fields 15, or may skip some locations. In this case, the adjustment area a 2010 or b 2020 alone may be located. The spiral track is wobbled by a sinusoidal wobble signal. The spatial frequency of wobbles is constant on the whole disk, as shown in FIG. 29. The role of the wobbles is as has already been explained previously.

A predetermined number of recording fields 15 where data is rewritable are recorded on the spiral track. As shown in FIGS. 29 and 9, each recording field 15 is comprised of a header field 19 for storing address data of the recording field 15, and a data field 20 for storing various data. Details of the recording field 15 are as has been explained early.

When the recording fields 15 are successively recorded on the track, one recording field 15 may cross an index header 12. This is the case of a recording field 1500 in FIG. 29, and one recording field 1500 formed by a predetermined track length is broken up into two recording fields 1500-1 and 1500-2 across the index header 12. These two broken-up recording fields 1500-1 and 1500-2 will be referred to as sub recording fields a 16 and b 17 hereinafter. At this time, by appropriately selecting the length of the adjustment area b 2020, the recording field 15 can be broken up at a desired position.

The data structure of each index header 12 is as shown in FIG. 8. On the substrate of the optical disk 10, the aligned index headers 12 and a spiral recording track made from a wobbled groove are formed. When a phase change recording film like on a DVD-RAM is formed on this substrate, a rewritable optical disk can be provided. In general, an optical disk formed with the recording film undergoes annealing called initialization, and the recording film is converted into a crystalline state. When this recording film is irradiated with high-intensity laser spot pulses, that portion is converted into an amorphous state, and a signal can be written there. The written signal can be read by detecting the difference between reflectances in the crystalline and amorphous states.

Details of the recording field 15 are as shown in FIG. 9. FIG. 9 has already been explained.

FIG. 30 shows the layout of the adjustment areas a 2010 and b 2020. The layout of the adjustment areas a 2010 will be explained below using FIG. 30. The adjustment areas a 2010 are assured to adjust the trailing end positions of the spiral track and recording fields 15. When the spiral track is made from a wobbled groove, as shown in FIG. 30, if wobbles are formed at a constant spatial frequency, a wobble may be intercepted by an index header halfway through its cycle. When data is recorded in an odd wobble less than one cycle, it becomes hard to measure the wobble frequency upon reproduction of the disk. Hence, an odd wobble less than one cycle is specified as an adjustment area a 2010, i.e., an area where no recording field 15 is written. The whole adjustment area a 2010 may be formed by a groove track, or it may be partially or entirely defined by a mirror field or embossed pit section. At this time, when the groove is cut off at the end of the adjustment area a 2010 on the side opposite to the index header 12, and a mirror field or embossed pit section is formed, since the groove length of the track can be an integer multiple of the wobble cycle, the number of wobbles can be easily counted. The adjustment area a 2010 is formed in the neighborhood of the index header 12, and either the adjustment area b 2020, or the recording field 15 or sub recording field is formed on the side opposite to the index header.

The layout of the adjustment areas b 2020 will be explained below. The adjustment area b 2020 is formed to adjust the break-up position of the recording field 15. As described above, when recording fields 15 are set in turn in the spiral track, a recording field 15 crosses the index header 12. In this case, that recording field 15 is broken up into sub recording fields a 16 and b 17, as shown in FIG. 11A. In this case, since data in the recording field 15 is processed in units of sync frames, the recording field 15 must be avoided from being broken up at the middle of a sync frame. If a sync frame is broken up, it becomes difficult to determine the trailing end position of the signal, and synchronization upon reading out a signal cannot be taken. To solve such problems, when a recording field 15 is set, and the interval between the last sync frame on the track and the adjustment area a 2010 becomes equal to or smaller than one sync frame, i.e., becomes shorter than 8 wobbles, that portion is specified as an adjustment area b 2020 to inhibit the recording field 15 from being written there. The adjustment area b 2020 is used as a groove field, mirror field, or embossed pit section. When the adjustment area b 2020 is defined by a mirror field or embossed pit section, a track that neighbors the recording field 15 is not defined by a mirror field or embossed pit section but by a groove area so as to avoid optical influences on the data recording area.

The present invention will be explained using practical numerical values. Assume that the wavelength of a violet laser is 405 nm, the NA of an objective lens is 0.66, the diameter of the optical disk is 120 mm, and the recording area ranges from 24.00 mm to 58.60 mm as in the DVD-RAM. Data recording uses a ZCLV recording scheme as in the DVD-ROM. Note that lead-in and lead-out areas respectively formed on the inner and outer sides of the disk are omitted.

FIG. 32 shows an embodiment of the layout of tracks. The track pitch is set at 0.348 µm in consideration of cross erase with neighboring tracks. The total number of tracks is 99,000. On the other hand, if the bit length is 0.159 µm in consideration of OTF, since an index header for two sync frames is recorded, track 0 as the innermost track wobbles 10,165.9 times.

At this time, a 0.9 wobble length at the end of wobble track 0, which is smaller than one wobble length, is defined as an adjustment area a 2010. Since one sync frame has an 8-wobble length, when three recording fields 15 each consisting of 420 sync frames are written in track 0, the number of extra wobbles is 84. Since another 10 sync frames are assigned to a extra track for 84 wobbles, a sub recording field a for 10 sync frames is generated. In the sub recording field a 16 for 10 sync frames, four sync frames are assigned to a front and rear, and six sync frames are assigned to a data portion. In next track 1, a sub recording field b 17 for 414 sync frames is generated. In the sub recording field b 17 for 414 sync frames, four sync frames are assigned to a front and rear, and 410 sync frames are assigned to a data portion. When 10 sync frames are assigned to 84 extra wobbles of track 0, a remainder of four wobbles is generated. However, since these wobbles cannot form one sync frame which consists of eight wobbles per sync frame, they become the remainder, and these four wobbles correspond to the aforementioned adjustment area b 2020.

Subsequently, track 1 wobbles 10,176.1 times. At this time, a 0.1 wobble length at the end of wobble track 1, which is smaller than one wobble length, is defined as an adjustment area a 2010. When two recording fields 15 each consisting of 420 sync frames are recorded after the sub recording field b 17 for 414 sync frames, the number of extra wobbles is 133. Since 16 sync frames are assigned to these extra wobbles, a sub recording field a 16 for 16 sync frames is generated. In the sub recording field a 16 for 16 sync frames, four sync frames are assigned to a front and rear, and 12 sync frames are assigned to a data portion. In next track 2, a sub recording field b 17 for 408 sync frames is generated. In the sub recording field b for 408 sync frames, four sync frames are assigned to a front and rear, and 404 sync frames are assigned to a data portion.

When this process is repeated, the layout of all recording fields 15, sub recording fields, and adjustment areas is determined on the entire recording area. The format efficiency at that time is around 83.7%. Note that FIGS. 31 and 32 summarize such data. This value is about 1% lower than 84.7% of the DVD-ROM and is greatly improved compared to 75.9% of the DVD-RAM. The recording density is improved by about 0.4% compared to a case wherein similar recording fields 15 are recorded on a ZCLV disk obtained by breaking up the disk described in the previous application into 100 zones. In this embodiment, adjustment areas of around 4 Mbytes can be assured in addition to the recording fields 15.

The use method of the adjustment areas will be explained below. Note that the adjustment areas are used in various purposes for the following reasons.

As an optical disk has a higher recording density, deterioration of a reproduction signal due to the influences of crosstalk between neighboring tracks and intersymbol interference is not negligible. As a method for combating this problem, a waveform equalization condition is determined by reproducing a training pattern as known data on a disk, thus compensating for deterioration of a reproduction signal. Also, a method of measuring any tilt of a disk using such condition and reproduction information itself of known data is available. In these methods, however, a training pattern must be recorded beforehand on the disk.

On the other hand, as recording marks are miniaturized, the influences of variations of the recording sensitivity and a change in laser output with respect to a recording medium due to variations of the film thickness of the recording medium and environmental temperature drift, edge shift based on such changes, or edge shift due to variations of a servo system become more serious, and it becomes harder to form uniform recording domains. To solve this problem, a method of assuring a test recording area on a portion of a disk, making test write of recording marks on this test recording area before recording of user data, and optimizing recording conditions such as laser power upon recording, recording strategy, and the like has been proposed.

In order to reinforce protection of information recorded on a disk, copy protection information may be embedded on the disk.

However, insertion of the aforementioned training pattern or copy protection information in a portion of a recording field leads to format efficiency drop.

Also, when a portion of the recording field is used as the test recording area, this also results in format efficiency drop.

When the training pattern is inserted in the recording field, it becomes difficult to specify its position during recording/reproduction. In addition, such pattern disturbs continuous recording. The same applies to a case wherein copy protection information or test recording area is inserted.

Alternatively, the training pattern may be recorded in a lead-in or lead-out zone on the inner or outer periphery side of the disk. However, in this case, the waveform equalization condition is determined at a position separate from an area where information is actually recorded or reproduced. Since the recording/reproduction condition largely changes depending on the radial position on the disk, the influence of this problem is serious. The same applies to the location of the test recording area. When copy protection information is integrally inserted in a portion of the disk, it becomes difficult to manage information of small units in the disk.

For the aforementioned reasons, data having a known mark length and mark spacing is recorded in each adjustment area on the optical disk 10. Using this data as a training pattern for waveform adaptive equalization and a crosstalk canceller, the waveform equalization precision upon reproducing the disk can be improved. Details of such data are as have already been explained previously.

Furthermore, a test recording area for adaptive control of the recording strategy is assured in the adjustment area of the disk 10. Before recording desired data, test recording of data having a known mark length and mark spacing is done on this test recording area while increasing/decreasing the pulse width and amplitude of the recording strategy, a statistical process is done by reproducing the recorded results, and an optimal recording strategy is determined based on the obtained result. Since the adjustment areas are assured entirely in the radial direction of the disk, if this portion is used as a test recording area, the test recording areas can be assured entirely in the radial direction. Since an optimal recording strategy changes depending on a change in radial position due to a change in film thickness or recording sensitivity of the recording medium, if test recording is done at a radial position near an area where desired data is to be recorded, an optimal recording strategy can be determined with higher precision.

Moreover, copy protection data is recorded in the adjustment area of the disk 10. Since this data is distributed entirely in the radial direction of the disk, high-performance copy protection for information within a small range can be attained.

The format efficiency of the recording fields 15 never drops due to recording of the training pattern, test recording area, and copy protection data.

An optical disk apparatus for recording/reproducing data on/from the aforementioned optical disk 10 is as shown in FIG. 23. FIG. 23 has already been described above. A read-only optical disk apparatus is as shown in FIG. 24. FIG. 24 has also already been described.

Figure 33:
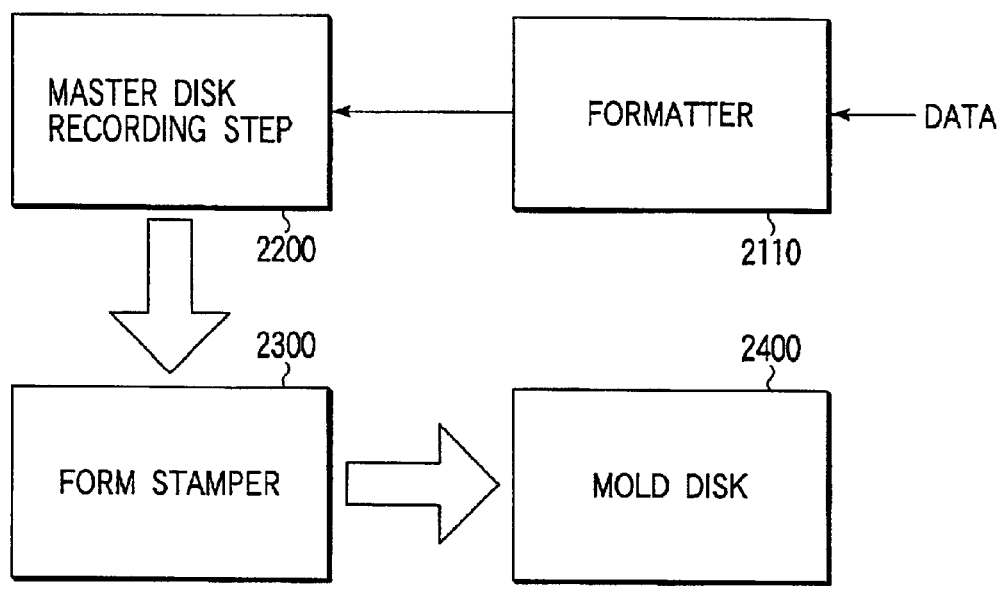
FIG. 33 shows an example of a method of manufacturing a read-only information recording medium of the present invention.

The information recording medium of the present invention can be applied not only to a recordable/reproducible disk but also to a read-only disk. FIG. 33 shows a method of manufacturing a read-only disk. Data to be recorded is input to a formatter 2110. The formatter 2110 appends format information to the input data to generate data to be recorded on a disk. The generated data is recorded on a master disk (master disk recording process 2200). The master disk is used to form a stamper (stamper formation 2300), and a disk is molded using the stamper (disk molding 2400). On the read-only disk, if all adjustment areas are formed by pit areas, they can be tracked in the same manner as in recording fields. If the adjustment areas are formed by a groove, tracking can be done in the same manner as in a recordable/reproducible disk.

Physical formatting mainly for computer use will be explained below using the flow chart shown in FIG. 25. Physical formatting has already explained in the first embodiment with reference to FIG. 25. Hence, physical formatting will be briefly explained.

Each recording track consists of a plurality of recording fields 15 (including sub recording fields). The physical address of an arbitrary recording field is determined by a track address recorded as an embossed pattern in the index header and the number of wobbles starting from the index header.

The optical disk 10 is set in the optical disk apparatus, and the spindle motor 100 is rotated (ST11). Subsequently, focus control is executed (ST11). The optical head 110 is moved to the lead-in area located at the inner peripheral side while executing tracking control (ST11). Furthermore, when the beam spot passes a training pattern which is used to detect a tilt amount and is formed by embossed pits, the signal processor 130 detects a tilt amount, and controls tilt ACT based on the detection result. At this time, the controller 150 serves as a tilt controller. A wobble signal is detected in this state (ST12), and rotation of the motor is controlled by CLV on the basis of the wobble signal (ST13).

As it is the first recording since disk insertion, the recording strategy is optimized before physical formatting. An appropriate test recording area is sought by reading the index header and counting the number of wobbles (ST14). When the spot falls within the test recording area, the controller 150 generates test data based on information of a test pattern recorded in the memory 151, and records the test pattern. The signal processor 130 then executes a statistical comparison/discrimination process of a reproduction signal of the recorded test pattern and the test pattern stored in the memory 151, thus determining an optimal recording strategy. The result is stored in the controller 150, and is used in recording control later. When a physical formatting command is issued to the optical disk apparatus via an interface 190, track 0 is sought by reading the index header. On the other hand, the formatter generates data to be recorded in the header field 19 and data field 20 as preparation for write in the recording fields 15. Upon detection of an index header 12 formed by an emboss signal in track 0, recording in recording field 15 immediately starts. The recording clock uses a clock obtained by multiplying the wobble signal by a constant, and a signal read out from the formatter is input to an LD driver 160, thus starting recording on the optical disk 10. The address of the recording field 15 is incremented, and recording fields are recorded in turn. As described above, control is made not to write any recording fields 15 in the adjustment areas a 2010 and b 2020 of each track. After the last recording field 15 of the outermost track on the recording area is recorded, a write of a format signal on the first recording layer 214 is complete. When the beam spot crosses the test recording area during formatting, an optimal recording strategy may be re-determined. Data to be recorded in the data field is used to inspect the optical disk for defects, and the same data is recorded in all the recording fields 15. Also, the known training pattern stored in the memory 15 is recorded in a desired adjustment area.

Recording of user data on the disk that has undergone physical formatting, as described above, will be explained below with reference to the flow chart shown in FIG. 26. Recording of user data has already been explained in the first embodiment with reference to FIG. 26. Hence, a brief explanation will be given.

The optical disk 10 is set in the optical disk apparatus, and the spindle motor 100 is rotated (ST21). Subsequently, focus control is executed (ST21). The optical head 110 is moved to the lead-in area located at the inner peripheral side while executing tracking control (ST21). Furthermore, when the beam spot has passed the training pattern for tilt amount detection, the signal processor 130 detects a tilt amount, and controls tilt ACT based on the detection result. In this state, a wobble signal is detected (ST22), and rotation of the motor is controlled based on the wobble signal (ST23). The address recorded in the header field of each recording field 15 is read (ST24) to access an area where the training pattern is recorded. The training pattern is reproduced to optimize the tap gains of the adaptive equalizer and crosstalk canceller (ST24). When a user data recording command is issued to the optical disk apparatus via the interface 190, a test recording area near a target recording field 15 is accessed. Test recording is done to determine an optimal recording strategy, and the target recording field 15 is then accessed. User data is recorded on the basis of recording clocks generated by the controller 150 from a wobble signal (ST25). At this time, copy protection data is recorded in a desired adjustment area as needed.

The reproduction process of data recorded on the optical disk 10 will be described below with reference to the flow chart shown in FIG. 27. The reproduction process has already been explained in the first embodiment with reference to FIG. 27. Hence, a brief explanation will be given.

The optical disk 10 is set in the optical disk apparatus, and the spindle motor 100 is rotated (ST31). Subsequently, focus control is executed (ST31). The optical head 110 is moved to the lead-in area located at the inner peripheral side while executing tracking control (ST31). Furthermore, when the beam spot has passed a training pattern for tilt amount detection, which is formed by embossed pits or a training pattern formed by a recording mark, the signal processor 130 detects a tilt amount, and controls tilt ACT based on the detection result. In this state, a wobble signal is detected (ST32), and rotation of the motor is controlled based on the wobble signal (ST33). When a user data reproduction command is issued to the optical disk apparatus via an interface 190, the address recorded in the header field of the recording field 15 is read (ST34) to access a target recording field 15. At this time, when the beam spot crosses the training pattern, the tap gains of the adaptive equalizer and crosstalk canceller are optimized (ST34). User data recorded in the data field of the target recording field 15 is reproduced on the basis of reproduction clocks generated by the controller 150 based on the wobble signal (ST35). When copy protection data is recorded in a given adjustment area, it is reproduced together.

In the second embodiment, groove recording has been exemplified. However, the present invention can be applied to land & groove recording. In this case, the right and left wobble positions may change on a land track, but wobbles on one side of the track can be used. To attain such use, a signal on one side of the multi-split PD of the optical head 110 can be used. Also, in this case, a single spiral can be achieved by switching land and groove tracks.

In the present invention, a rewritable optical disk has been exemplified. However, the present invention can be similarly applied to a medium such as a write-once disk or the like on which data can be recorded only once.

Furthermore, in the present invention, a rewritable optical disk has been exemplified. In order to assure compatibility with the rewritable optical disk, exactly or nearly the same format as the present invention can be applied to a ROM type optical disk formed by embossed pits.

In the second embodiment of the present invention, the ECC block (32 kbytes: 416 sync frames) used in the DVD is used as an example of the data recording unit. When the recording density increases, ECC must be further strengthened and, in general, the ECC block size increases. When the ECC block size becomes 64 kbytes, the size of the recording field 15 increases accordingly, and other fields become small relative to the data portion. Therefore, the format efficiency can be further improved.

In the second embodiment of the present invention, a total of four sync frames are used for the front and rear of the recording field, but the present invention is not limited to such specific structure.

In the second embodiment of the present invention, an index header is defined by two sync frames, and four headers are set in the index header. However, the present invention is not limited to such specific structure.

In the second embodiment of the present invention, the maximum length of the adjustment area a 2010 is shorter than one wobble, and that of the adjustment area b 2020 is shorter than eight wobbles, but the present invention is not limited to them.

In the second embodiment of the present invention, wobbles are aligned on the right side of the index headers, but may be aligned on the left side.

In the present invention, the physical address of the recording field 15 is determined by one index header per round and wobbles formed on the optical disk. Once the disk has been formatted or undergone data recording, the address of the recording field 15 is physically transferred to the optical disk. When the recording field 15 crosses the index header, it is divisionally recorded in two sub recording fields, thus allowing continuous recording. By appropriately selecting an adjustment area, the recording field 15 can be broken up at a desired position. Since CLV recording that assures a constant recording density on the entire disk is adopted, high-density recording can be realized.

As described above, according to the present invention, an optical disk which can achieve high recording density and format efficiency, can efficiently record data at an arbitrary position, and can also efficiently record large-size, continuous data like video data can be provided. Furthermore, the format of the present invention can be applied to a recordable optical disk, and a ROM type optical disk formed by embossed pits. Moreover, an optical disk apparatus, optical disk recording method, and optical disk reproduction method for recording or reproducing data with respect to such optical disk can be provided.

In addition, by recording data having a known mark length and mark spacing in an adjustment area, adaptive equalization, crosstalk cancellation, and tilt amount measurement can be attained with higher precision. The recording strategy can be optimized by making test recording on the adjustment area. Also, copy protection data can be recorded in the adjustment area.

To recapitulate, according to the present invention, since adaptive equalization, crosstalk cancellation, tilt amount measurement, copy protection, and the like can be attained without recording extra data in the recording fields 15, a disk that can realize high-precision, high-reliability recording/reproduction even when the recording density increases can be provided without any format efficiency drop. Also, an optical disk apparatus, optical disk recording method, and optical disk reproduction method for recording or reproducing data with respect to such optical disk can be provided.

The format efficiency of the present invention is around 83.7%, and is greatly improved compared to 75.9% of the DVD-RAM. Since the format efficiency of the DVD-RAM that need be rewritten is 84.7%, the present invention can provide the aforementioned optical disk with only about 1% loss of the format efficiency compared to the DVD-ROM, and its practical effect is very high.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk-shaped information recording medium which has a first recording layer on which information can be recorded/reproduced by a light beam coming from a predetermined surface, and a second recording layer on which information can be recorded/reproduced by a light beam coming from the same predetermined surface, and which is stacked on said first recording layer, comprising:
   each of said first and second recording layers has
   a spiral track which defines a plurality of rounds, and
   at least one index header aligned in a radial direction of the disk to partially intercept said spiral track,
   said index header has address data of each round of said spiral track, which is formed by embossed pits, and
   some or all of said index headers of said first and second recording layers are laid out to overlap each other when viewed from the predetermined surface.

2. A medium according to claim 1, wherein said spiral track has wobbles having a constant spatial frequency, said spiral track has an area where a plurality of recording fields are recorded, and each recording field has a header field where address data is recorded, and a data field where target data is recorded.

3. A medium according to claim 1, wherein each of said first and second recording layers has a plurality of concentric zones, each zone includes the spiral track having wobbles, and the number of wobbles per round of the spiral track within a given zone is constant, and a disk rotational speed upon accessing a specific zone, and a frequency upon recording data on the specific zone, can be determined on the basis of a frequency reproduced from the wobbles of the spiral track.

4. A medium according to claim 2, wherein a specific one of said plurality of recording fields extends across said index header, the specific recording field has first and second sub recording fields to have said index header as a boundary, and each of said first and second sub recording fields has a connection field used to connect the two sub recording fields.

5. A medium according to claim 4, wherein said first sub recording field has a first header field and a first sub data field, said first sub data field has said connection field, said second sub recording field has a second sub data recording field, said second sub data field has said connection field, said connection field of said second sub data field has a second header field, and said first and second header fields record identical address data.

6. A medium according to claim 2, wherein a dummy area is arranged between said index header and said recording field.

7. A medium according to claim 2, wherein each of said first and second recording layers has a predetermined emboss field where data is recorded by embossed pits, and a mirror field, and dummy areas are respectively arranged between said index header and said recording field, between said predetermined emboss field and said recording field, and between said mirror field and said recording field.

8. A medium according to claim 7, wherein the dummy areas on another recording layer except for the deepest recording layer viewed from the predetermined surface have a transmittance and reflectance equal to said index header and said predetermined emboss field on that recording layer.

9. A medium according to claim 7, wherein the dummy areas are formed by the spiral track or embossed pits, and the dummy areas formed by the embossed pits are write-once recording & rewrite recording inhibition areas.

10. A medium according to claim 7, wherein when said second recording layer is a deeper layer than said first recording layer when viewed from the predetermined surface, the dummy areas on said first recording layer are narrower than the dummy areas on said second recording layer.

11. A medium according to claim 7, wherein the dummy areas have a training pattern formed by embossed pits.

12. An information recording apparatus for recording data on a disk-shaped information recording medium which has a first recording layer on which information can be recorded/reproduced by a light beam coming from a predetermined surface, and a second recording layer on which information can be recorded/reproduced by a light beam coming from the same predetermined surface, and which is stacked on said first recording layer, and in which each of said first and second recording layers has a spiral track which defines a plurality of rounds, and at least one index header aligned in a radial direction of the disk to partially intercept said spiral track, and said index header has address data of each round of said spiral track, which is formed by embossed pits, said apparatus comprising:

recording means for irradiating said information recording medium with a reproduction light beam from the predetermined surface side, reading address data of said index header reflected in reflected light of the reproduction light beam, and recording data by irradiating a target spiral track with a recording light beam on the basis of the address data.

13. An apparatus according to claim 12, further comprising recording field recording means for recording a plurality of recording fields each having a header field and a data field on said spiral track, recording address data in the header field, and recording target data in the data field.

14. An apparatus according to claim 13, wherein said recording field recording means records a specific recording field across said index header upon successively recording said recording fields on said spiral track, the specific recording field has first and second sub recording fields to have said index header as a boundary, each of said first and second sub recording fields has the header field and the data field, and said recording field recording means records identical address data in the header fields of said first and second sub recording fields.

15. An apparatus according to claim 13, wherein each of said first and second recording layers has a predetermined emboss field where data is recorded by embossed pits, and a mirror field, dummy areas are respectively arranged between said index header and said recording field, between said predetermined emboss field and said recording field, and between said mirror field and said recording field, and said recording means records a training pattern on the dummy areas.

16. An information recording method for recording data on a disk-shaped information recording medium which has a first recording layer on which information can be recorded/reproduced by a light beam coming from a predetermined surface, and a second recording layer on which information can be recorded/reproduced by a light beam coming from the same predetermined surface, and which is stacked on said first recording layer, and in which each of said first and second recording layers has a spiral track which defines a plurality of rounds, and at least one index header aligned in a radial direction of the disk to partially intercept said spiral track, and said index header has address data of each round of said spiral track, which is formed by embossed pits, said method comprising the step of:

irradiating said information recording medium with a reproduction light beam from the predetermined surface side, reading address data of said index header reflected in reflected light of the reproduction light beam, and recording data by irradiating a target spiral track with a recording light beam on the basis of the address data.

17. A method according to claim 16, further comprising the step of recording a plurality of recording fields each having a header field and a data field on said spiral track, recording address data in the header field, and recording target data in the data field.

18. A method according to claim 17, wherein a specific recording field is recorded across said index header upon successively recording said recording fields on said spiral track, the specific recording field has first and second sub recording fields to have said index header as a boundary, each of said first and second sub recording fields has the header field and the data field, and identical address data is recorded in the header fields of said first and second sub recording fields.

19. A method according to claim 17, wherein each of said first and second recording layers has a predetermined emboss field where data is recorded by embossed pits, and a mirror field, dummy areas are respectively arranged between said index header and said recording field, between said predetermined emboss field and said recording field, and between said mirror field and said recording field, and a training pattern is recorded on the dummy areas.

20. An information reproduction apparatus for reproducing data recorded on a disk-shaped information recording medium which has a first recording layer on which information can be recorded/reproduced by a light beam coming from a predetermined surface, and a second recording layer on which information can be recorded/reproduced by a light beam coming from the same predetermined surface, and which is stacked on said first recording layer, and in which each of said first and second recording layers has a spiral track which defines a plurality of rounds, and at least one index header aligned in a radial direction of the disk to partially intercept said spiral track, and said index header has address data of each round of said spiral track, which is formed by embossed pits, said apparatus comprising:

reproduction means for irradiating said information recording medium with a reproduction light beam from the predetermined surface side, reading address data of said index header reflected in reflected light of the reproduction light beam, and reproducing data by irradiating a target spiral track with a reproduction light beam on the basis of the address data.

21. An apparatus according to claim 20, wherein each of said first and second recording layers has a predetermined emboss field where data is recorded by embossed pits, and a mirror field, dummy areas are respectively arranged between said index header and said recording field, between said predetermined emboss field and said recording field, and between said mirror field and said recording field, and said reproduction means reproduces a training pattern from the dummy areas.

22. An information reproduction method for reproducing data recorded on a disk-shaped information recording medium which has a first recording layer on which information can be recorded/reproduced by a light beam coming from a predetermined surface, and a second recording layer on which information can be recorded/reproduced by a light beam coming from the same predetermined surface, and which is stacked on said first recording layer, and in which each of said first and second recording layers has a spiral track which defines a plurality of rounds, and at least one index header aligned in a radial direction of the disk to partially intercept said spiral track, and said index header has address data of each round of said spiral track, which is formed by embossed pits, said method comprising the step of:

irradiating said information recording medium with a reproduction light beam from the predetermined surface side, reading address data of said index header reflected in reflected light of the reproduction light beam, and reproducing data by irradiating a target spiral track with a reproduction light beam on the basis of the address data.

23. A method according to claim 22, wherein each of said first and second recording layers has a predetermined emboss field where data is recorded by embossed pits, and a mirror field, dummy areas are respectively arranged between said index header and said recording field, between said predetermined emboss field and said recording field, and between said mirror field and said recording field, and a training pattern is reproduced from the dummy areas.

\* \* \* \* \*